(12) United States Patent
Gopalan et al.

(10) Patent No.: US 10,587,500 B2
(45) Date of Patent: Mar. 10, 2020

(54) INTELLIGENT OPTICAL RESTORATION IN INTEGRATED MULTI-LAYER NETWORKS

(71) Applicant: Infinera Corp., Annapolis Junction, MD (US)

(72) Inventors: Abishek Gopalan, San Jose, CA (US); Rajan Rao, Fremont, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/482,159

(22) Filed: Apr. 7, 2017

(65) Prior Publication Data

US 2017/0295090 A1    Oct. 12, 2017

Related U.S. Application Data

(60) Provisional application No. 62/319,785, filed on Apr. 7, 2016.

(51) Int. Cl.
*H04L 12/26* (2006.01)
*H04L 12/703* (2013.01)
(Continued)

(52) U.S. Cl.
CPC .............. *H04L 45/28* (2013.01); *H04L 45/22* (2013.01); *H04L 45/64* (2013.01)

(58) Field of Classification Search
CPC ......... H04L 12/24; H04L 12/26; H04L 12/28; H04L 12/56; H04L 12/703; H04L 12/707;
(Continued)

(56) References Cited

U.S. PATENT DOCUMENTS

| 7,715,306 B2 * | 5/2010 | Lim ......................... H04J 3/14 370/216 |
| 9,774,502 B2 * | 9/2017 | Ong ....................... H04L 41/12 |

(Continued)

OTHER PUBLICATIONS

Liu et al, Dynamic OpenFlow-Based Lightpath Restoration in Elastic Optical Networks on the GENI Testbed, Journal of Lightwave Technology, vol. 33, No. 8, 9 pages, Apr. 15, 2015.*
(Continued)

*Primary Examiner* — Frank Duong
(74) *Attorney, Agent, or Firm* — David L. Soltz

(57) ABSTRACT

Memory devices, methods and systems are described in which a non-transitory memory device stores instructions that, when executed by a processor, cause the processor to: receive, via an input component, at least one message from a network element in a multi-layer network comprising information indicative of at least one failure of a working path; determine based at least in part on information indicative of a data transport path coincident with the working path in a second layer in the network different from the first layer, an alternate path in the first layer for transmission of the data through the multi-layer network; and transmit, via an output component, at least one signal comprising configuration instructions to at least one line module, the configuration instructions directing the line module to switch and transmit the data using the alternate path.

20 Claims, 15 Drawing Sheets

(51) Int. Cl.
*H04L 12/707* (2013.01)
*H04L 12/715* (2013.01)

(58) Field of Classification Search
CPC ..... H04L 45/22; H04L 45/28; H04L 41/0668; H04B 10/032; H04J 14/02; H04Q 11/0066; H04Q 2011/0081
See application file for complete search history.

(56) References Cited

U.S. PATENT DOCUMENTS

| | | | |
|---|---|---|---|
| 9,832,548 B2* | 11/2017 | Moynihan | H04Q 11/0003 |
| 2005/0063299 A1* | 3/2005 | Atkinson | H04J 14/0227 |
| | | | 370/216 |
| 2012/0321296 A1* | 12/2012 | Wellbrock | H04B 10/038 |
| | | | 398/5 |
| 2013/0089317 A1* | 4/2013 | Zhang | H04J 14/0284 |
| | | | 398/2 |
| 2013/0114416 A1* | 5/2013 | Rao | H04L 43/10 |
| | | | 370/241 |
| 2014/0016923 A1* | 1/2014 | Fernandez-Palacios | H04J 14/0267 |
| | | | 398/2 |
| 2015/0131997 A1* | 5/2015 | Syed | H04Q 11/0066 |
| | | | 398/69 |
| 2015/0188624 A1* | 7/2015 | Syed | H04B 10/032 |
| | | | 398/5 |

OTHER PUBLICATIONS

Liou et al, Open Transport Switch—A Software Defined Networking Architecture for Transport Networks, ACM, 6 pages, Aug. 2013.*

Azodolmolky et al, Integrated OpenFlow—GMPLS control plane: an overlay model for software defined packet over optical networks, Dec. 12, 2011 / vol. 19, No. 26 / Optics Express B428, 8 pages, Dec. 2011.*

Sato et al, GMPLS-Based Photonic Multilayer Router (Hikari Router) Architecture: An Overview of Traffic Engineering and Signaling Technology, IEEE, 6 pages, Mar. 2002.*

* cited by examiner

INTELLIGENT OPTICAL RESTORATION IN INTEGRATED MULTI-LAYER NETWORKS

FIELD OF THE DISCLOSURE

The disclosure hereby incorporates by reference the provisional patent application identified by U.S. Ser. No. 62/319,785, filed on Apr. 7, 2016.

FIELD OF THE DISCLOSURE

The disclosure generally relates to methods and apparatuses for orchestration of configuration, protection and restoration in multiple layers in data transport networks. In one implementation, the disclosure relates to methodologies and systems for multi-layer interaction to perform restoration in data transport networks.

BACKGROUND

Information transport networks are well known in the art and function to transmit information such as computer data between various computer systems operably coupled to the information network. Client networks may be sending to and receiving information from the information transport networks, for example, through one or more routers. Generally, data transport networks are defined as having multiple "layers" that combine to make a network. For example, one standard that describes a multi-layer model is the International Telecommunication Union recommendation ITU-T X.200 (07/94), entitled "Information technology—Open Systems Interconnection—Basic Reference Model: The basic model." The Open Systems Interconnection (OSI) Model contains the following seven layers: the Application Layer (layer 7), the Presentation Layer (layer 6), the Session Layer (layer 5), the Transport Layer (layer 4), the Network Layer (layer 3), the Data Link Layer (layer 2), and the Physical Layer (layer 1). The model may also include a Layer Zero containing transmission media. Layers may be generally referred to as electronic layers (also known as digital layers) and optical layers.

The electronic/digital layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. Additional structure, architecture, and modeling are further described in the International Telecommunication Union recommendations, including ITU-T G.709, ITU-T G.872, and ITU-T G.805, which are well known in the art.

Typically, packet switched network systems are interconnected using wavelengths from the optical transmission backbone (the transport layer) that may contain a mix of wave-division multiplexing (WDM) (optical) transmission and/or Optical Transport Network (OTN) (Digital) switching technologies and/or packet switching technologies. Conventionally, traffic engineers may set or pre-engineer one or more paths for a data traffic flow through the packet switched layer of the network, or the path may be computed using native routing protocols within the packet switched layer.

A switched network usually includes multiple switch nodes (also referred to as "nodes") which are connected by communication links and arranged in a topology referred to in the art as a "mesh network". Within the mesh network, user traffic can be transported between any two locations using predefined connections specifying particular links and/or switch nodes for conveying the user traffic. Shared Mesh Protection (SMP) is a common protection and recovery mechanism in mesh networks, where multiple services can share the same set of network resources (such as bandwidth or timeslots on a common path) for protection purposes. Mesh networks utilizing Shared Mesh Protection may be referred to as shared mesh networks.

The switch nodes in the mesh network are each provided with a control module. The control modules of the switch nodes function together to aid in the control and management of the mesh networks. The control modules can run a variety of protocols for conducting the control and management of the mesh networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel. Wave-division multiplexing (WDM) is a type of multiplexing in which two or more optical carrier signals are multiplexed onto a single optical fiber by using different wavelengths (that is, colors) of laser light.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. Typically, the headend node or tailend node initially selects to receive data over the working connection (such as an optical channel data unit label switched path) and then, when a working connection fails, the headend node or tailend node selects a protecting connection for passing data within the mesh network. The set up and activation of the protecting connections may be referred to as restoration or protection. Protection mechanisms, where network resources act as backup for working connections, have been in use for some time.

Routing and topology management protocols may also be used with GMPLS. For example, under OSPF protocols, typically each node in a network maintains a database of the network topology and the current set of resources available, as well as the resources used to support traffic. In the event of any changes in the network, or simply periodically, the node floods the updated topology information to all the network nodes. The nodes use the database information to chart routes through the network.

In current systems, to set up a connection in an information transport network, nodes in the network exchange messages with other nodes in the network (for example, by using RSVP or RSVP-TE signaling protocols). Resources required for the connection are reserved and switches inside a node of the network are pre-configured to forward information from certain input ports to certain output ports. Information sent by signaling protocols are often in a type-length-value (TLV) format. The same protocols may also be used to take down connections in the network when the connections are no longer needed.

Current systems typically control configuration, protection and recovery mechanisms at the digital level in the network. Particularly, protection resources are typically controlled by the nodes and may be dedicated to act as backup paths (protection paths) in the event of a failure in the network resources carrying data traffic through the working paths. For example, in Shared Mesh Protection (SMP) the headend node or tailend node initially sets up one or multiple protection paths for a particular working path. During setup, network resources, for example, nodes, communication links, and timeslots, are specified for each path. Each protection path may reserve the timeslots on the intermediate nodes of the protection path, but does not actually configure them until needed. The timeslots may be shared by multiple protection paths.

The implementation of recovery in the network after a failure generally includes the source and/or destination nodes in the path digitally switching to the reserved nodes and communication links outside of the original working path to reroute data traffic through the network. The nodes may have limited knowledge of the bandwidth resources available in the network. Additionally, it may be inefficient to dedicate and reserve backup paths and to switch to those backup nodes.

As information transport systems move to integrated optical and digital network models, systems and methods are needed to orchestrate network resources and to configure and control network elements across multi-layers in the network, for example, for protection and restoration services.

SUMMARY

The problem of inadequate mechanisms for addressing protection and recovery mechanisms in integrated networks is addressed through methods and systems for multi-layer interaction to perform restoration in data transport networks.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
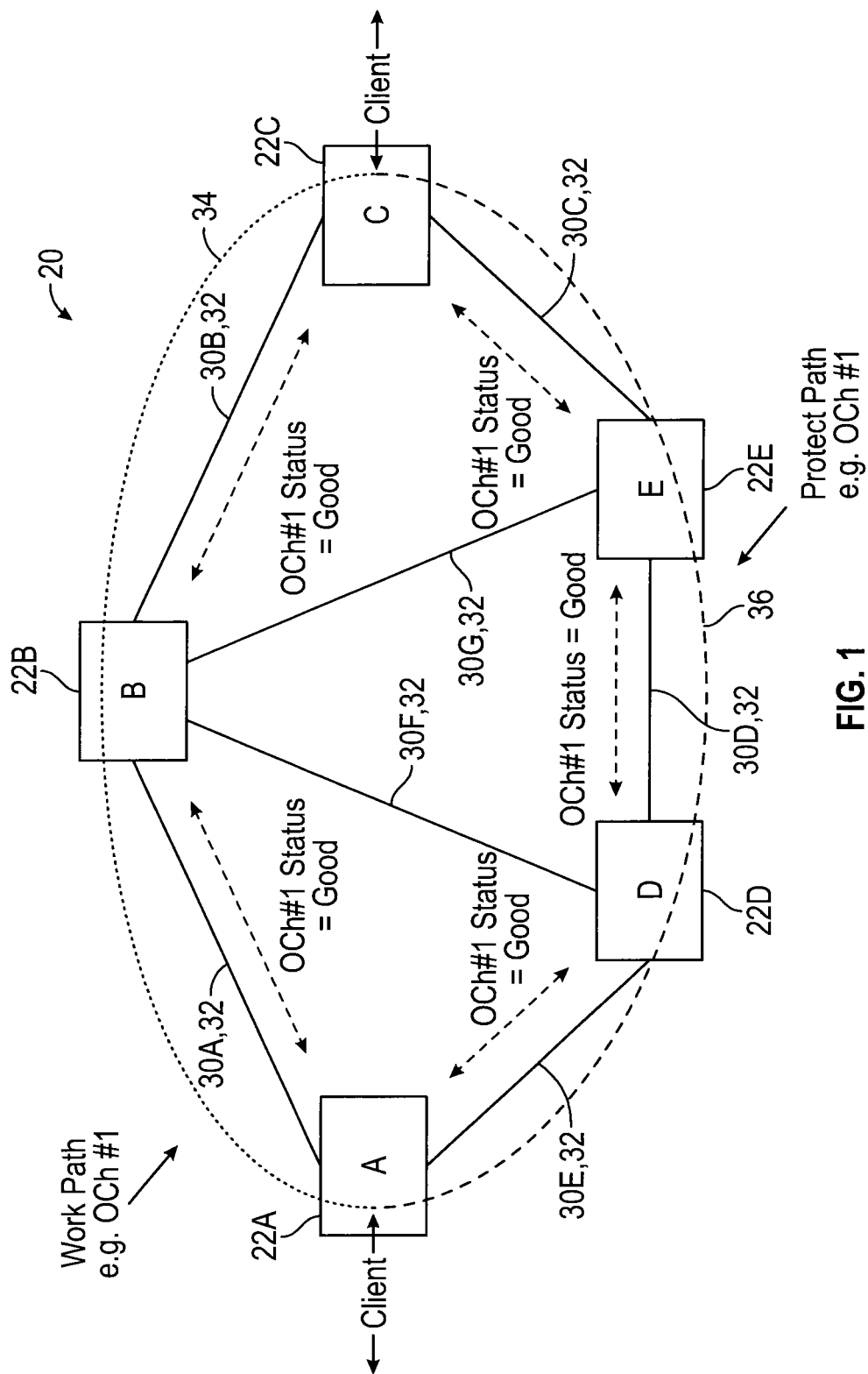
FIG. 1 is an illustration of an exemplary optical transport network.

The following detailed description refers to the accompanying drawings. The same reference numbers in different drawings may identify the same or similar elements.

The mechanisms proposed in this disclosure circumvent the problems described above. The mechanisms proposed in this disclosure provide additional flexibility in the management, configuration, discovery, monitoring and provisioning of the transport network. The present disclosure describes methods and systems which enhance the management and provisioning of transport networks including restoration and/or protection of optical links (i.e., optical restoration. In some embodiments, the transport network is provided with a plurality of nodes with at least some of the nodes having a control module having a first processor accessing a first database storing first network node configuration information and being configured to compute a first path to a destination node within the transport network through the output interface with the first network node configuration information. Once the first path is computed, then the first processor sends first signals, which can conform to RSVP or RSVP-TE signaling protocols to other nodes on the first path so that the other nodes will be configured to be a part of the first path. The first processor can be a component of a headend node of the first path.

The system is also provided with a configuration manager that may be separate from the plurality of nodes. The configuration manager may have a second processor accessing a second database storing second network node configuration information and being configured to compute a second path from a headend node (that does not include the second processor) to a tailend node of the plurality of nodes, updating the second network configuration information with information indicative of the second path, and sending second signals to at least the headend node and the tailend node to set up and enable the second path. The second signals may conform to the protocol of the first signals, or may utilize a different protocol such as a protocol referred to in the art as "OpenFlow."

Utilizing first and second processors with the first processor being a part of the headend node of the paths computed by the first processor within the transport network, and the second processor being separate from the headend node of at least some of the paths computed by the second processor within the transport network provides additional flexibility in the management, configuration, discovery, monitoring and provisioning of the transport network as will be discussed below.

The first processor may execute "implicit provisioning" in which a configuration manager instructs the headend node to compute the path. In this case, the creation of required cross-connects may be handled by the GMPLS control plane running on the network elements.

The second processor may execute "explicit provisioning" in which the configuration manager computes the path and also instructs network elements to create any required cross-connects. In this scenario, the GMPLS control plane running on the network elements is not required for path computation purposes.

The present disclosure describes in one embodiment methods and systems for storing, in a non-transitory memory device, multi-layer network information comprising at least one of link availability, bandwidth availability, priority levels for paths in a multi-layer network, path status in the multi-layer network, and status for network elements in the multi-layer network; receiving, via at least one input component, at least one message from a network element in the multi-layer network comprising information indicative of at least one failure of at least one working path in the network, wherein the working path carries data traffic through the network when there is no failure; determining, automatically, based at least in part on the multi-layer network information, an alternate path for transmission of the data traffic through the multi-layer network; and transmitting, via at least one output component, at least one signal comprising configuration instructions to at least one optical line module, the configuration instructions directing the optical line module to switch and select the data traffic using the alternate path.

In one embodiment, a processor may receive, via at least one input component, at least one message from a network element in a multi-layer network. The at least one message may comprise information indicative of at least one failure of at least one working path in the multi-layer network. The message may be received in a pre-determined periodic interval prior to failure of a working path or on a threshold basis, for example. The working path may be configured in a first layer of the network and carry data through the network when there is no failure. Based at least in part on information indicative of a data transport path coincident with the working path in a second layer in the network, an alternate path may be automatically determined in the first layer for transmission of the data through the multi-layer network. At least one signal comprising configuration instructions may be transmitted via at least one output component to at least one line module, the configuration instructions may direct the line module to switch and transmit the data using the alternate path.

The processor may be within a distributed module such that the processor is located within an optical node and the working path is connected to the optical node within the multi-layer network. Alternatively, the processor may be within a network module wherein the processor is located within a controller external to an optical node with the optical node connected to the working path within the multi-layer network.

The information indicative of a data transport path may include data traffic, a determination of high priority services carried on the second layer in the multi-layer network, a determination of services needing single-level failure recovery at the second layer in the network, a determination of services needing multiple level failure recovery in the second layer in the network, and/or the like.

In one embodiment, the methods and systems may also determine, automatically, based at least in part on information indicative of an accounting of hops for optical layer links traversed, an alternate path in a first layer in a multi-layer network. The alternate path in the first layer may be for transmission of the data through the multi-layer network. In one example, a first alternate path may have a first number of hops that is lower than a second number of hops in a second alternate path such that the configuration instructions direct a line module to switch and transmit data to the first alternate path prior to the second alternate path. The determination of the alternate path may further include information indicative of a data transport path coincident with a working path in a second layer in the multi-layer network. The information indicative of a data transport path coincident with the working path may include data traffic, a determination of high priority services carried on a second layer in the multi-layer network, a determination of services needing single-level failure recovery at the second layer in the multi-layer network, a determination of services needing multiple level failure recovery at the second layer in the multi-layer network, and/or the like.

In one embodiment, the methods and systems may also determine, automatically, an alternate path in a first layer of a multi-layer network based at least in part on information indicative of an assignment of weight proportional to a number of optical SNC links within the alternate path in the first layer. For example, a first alternate path may have a first weight lower than a second weight of a second alternate path. The configuration instructions may direct a line module to switch and transmit data to the second alternate path prior to the first alternate path. The determination of the alternate path may further include information indicative of a data transport path coincident with a working path in a second layer in the multi-layer network. The information indicative of a data transport path coincident with the working path may include data traffic, a determination of high priority services carried on a second layer in the multi-layer network, a determination of services needing single-level failure recovery at the second layer in the multi-layer network, a determination of services needing multiple level failure recovery at the second layer in the multi-layer network, and/or the like.

In one embodiment, the methods and systems may also determine, automatically, based at least in part on the multi-layer network information, which of the failed working paths has higher priority; and transmit, via the at least one output component, at least one signal comprising configuration instructions to at least one network element having integrated digital and optical components, the configuration instructions directing the optical component to switch the data traffic from the higher priority working path to the alternate path.

In one embodiment, a method may comprise transmitting, with circuitry of a first node in a network, to a configuration management device, a signal comprising information indicative of at least one failure to transmit optical data in at least one working path through a network; receiving, by at least one optical line module in the first node, from the configuration management device, a signal comprising instructions for switching at least one optical data transmission from the at least one working path to an alternate path using the at least one optical line module in the first node; and switching, with the at least one optical line module in the first node, the optical data transmission to the alternate path.

In one embodiment, the at least one optical line module may comprise at least one ROADM based optical line module.

In one embodiment, the at least one optical line module may provide Colorless, Directionless, and Contentionless functionality.

Definitions

If used throughout the description and the drawings, the following short terms have the following meanings unless otherwise stated:

API stands for Application Program Interface.

APS stands for Automatic Protection Switching.

CDC stands for Colorless, Directionless, and Contentionless. CDC functionality of circuitry of a network element allows for the flexible set up and/or modification of wavelength paths through a network.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance, and generally refers to the control and management of a network.

OTN stands for Optical Transport Network which includes a set of optical switch nodes which are connected by optical fiber links. ITU-T recommendations G.709 and G.872 define OTN interface requirements and network architecture respectively.

ROADM stands for reconfigurable optical add/drop multiplexer. Network operators can remotely reconfigure the multiplexer by sending soft commands with a ROADM. A ROADM may receive an optical signal containing information, for example, information regarding the Operation, Administration, and/or Maintenance (OAM) of optical layers in the transport network. The ROADM may extract the information from the signal. The ROADM may also insert information, such as OAM information, into an outgoing signal.

SDN stands for Software Defined Networking. SDN, as used herein, includes software, which may be executed by hardware that is separate from switch nodes within the optical transport network, and which includes the functionality to compute and provision paths through the optical transport network for multiple switch nodes as well as instruct one or more switch nodes to compute paths through the optical transport network.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

Network Priority refers to Setup & Holding priority as defined in RFC 3209, "RSVP-TE: Extensions to RSVP for LSP Tunnels", December 2001. In general, network priorities are assigned to connections in a shared mesh network and utilized to indicate which connections take precedent over other connections.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

An exemplary optical transport network (OTN) 20 is shown in FIG. 1, by way of example. FIG. 1 illustrates a channel status flow for a service in channel protection. The optical transport network 20 includes optical nodes 22a-22n (hereinafter referred to as "nodes" or "optical nodes" or "photonic nodes"). The optical transport network 20 may include any number of optical nodes 22a-22n. For exemplary purposes, the optical transport network 20 of FIG. 1 includes five optical nodes 22a-22e. The optical transport network 20 may be configured in any topology, for example, linear, ring, or mesh.

A headend node and a tailend node may be denoted for a particular path in accordance to the path setup direction. In this example, optical node 22a functions as a headend node (also known as a source node); while optical node 22c functions as a tailend node (also known as a destination node). Other optical nodes 22 between the headend node 22a and tailend node 22c in a particular path are known as intermediate nodes. In this example, the optical nodes 22b, 22d, and 22e act as intermediate nodes. In between the optical nodes 22a-22n are communication links 30a-30m. For purposes of simplicity of explanation, links 30a-30g are illustrated in FIG. 1, but it will be understood that there may be more or fewer communication links 30.

The optical nodes 22a-22n are adapted to facilitate the communication of data traffic (which may be referred to herein as "traffic" and/or "data") between optical nodes 22a-22n in the optical transport network 20 over communication links 30a-30m, as well as into and out of the optical transport network 20. Control information is also sent and received by optical nodes 22a-22n over communication links 30a-30m. The control information may be carried via an Optical Supervisory Channel (OSC) 32 through the communication links 30a-30m. As previously described, the OSC 32 is an additional wavelength that is adapted to carry information about the optical transport network 20 and may be used for management functions. The OSC 32 is carried on a different wavelength than wavelengths carrying actual data traffic and is an out-of-band channel. Typically, the OSC 32 is used hop-by-hop and is terminated and restarted at every node.

The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

Data traffic and control information may follow one or more paths through the optical transport network 20. A working path 34 (for example, OCh #1) may be established by one or more optical nodes 22a-22n, or by a controller (not shown) separate from the optical nodes 22a-22n and/or separate from the optical transport network 20. In the example shown in FIG. 1, the working path 34 is established between headend node 22a and tailend node 22c through intermediate node 22b. The working path 34 initially carries data traffic and control information, and continues to carry data traffic and control information while there is no failure on the working path 34.

A protection path 36 (for example, OCh #1) may also be established to carry data traffic and control information. The headend node 22a and the tailend node 22c may select data traffic from the protection path 36 if there is a failure on the working path 34. In FIG. 1, the protection path 36 is illustrated between headend node 22a and tailend node 22c through intermediate optical nodes 22d and 22e.

The working path 34 and the protection path 36 can be established by one or more optical nodes 22a-22n, such as headend node 22a, prior to any failure in the optical transport network 20, as illustrated in FIG. 1. Additionally, or alternately, one or more protection path 36 may be established after a failure in the optical transport network 20 (see FIGS. 9-10). The working path 34 and the protection path 36 may be established, for example, by using GMPLS protocols. The working path 34 and the protection path 36 may be bi-directional or co-routed.

In general, the term "dedicated protection," as used herein, refers to a situation in which the headend node 22a or tailend node 22c sets up a dedicated protection path 36 for a particular working path 34, as illustrated in FIG. 1, in case of failure of the working path 34, before failure of the working path 34. A type of dedicated protection in accordance with an embodiment of the present disclosure is known in the art as "1+1 Protection." In dedicated protection, the data traffic is simultaneously transmitted from the headend node 22a (and/or tailend node 22c) on both the working path 34 and protection path 36. Dedicated protection may be used with unidirectional and bidirectional protection, as described in RFC 4872, "RSVP-TE Extensions for E2E GMPLS Recovery" (May 2007).

Figure 2:
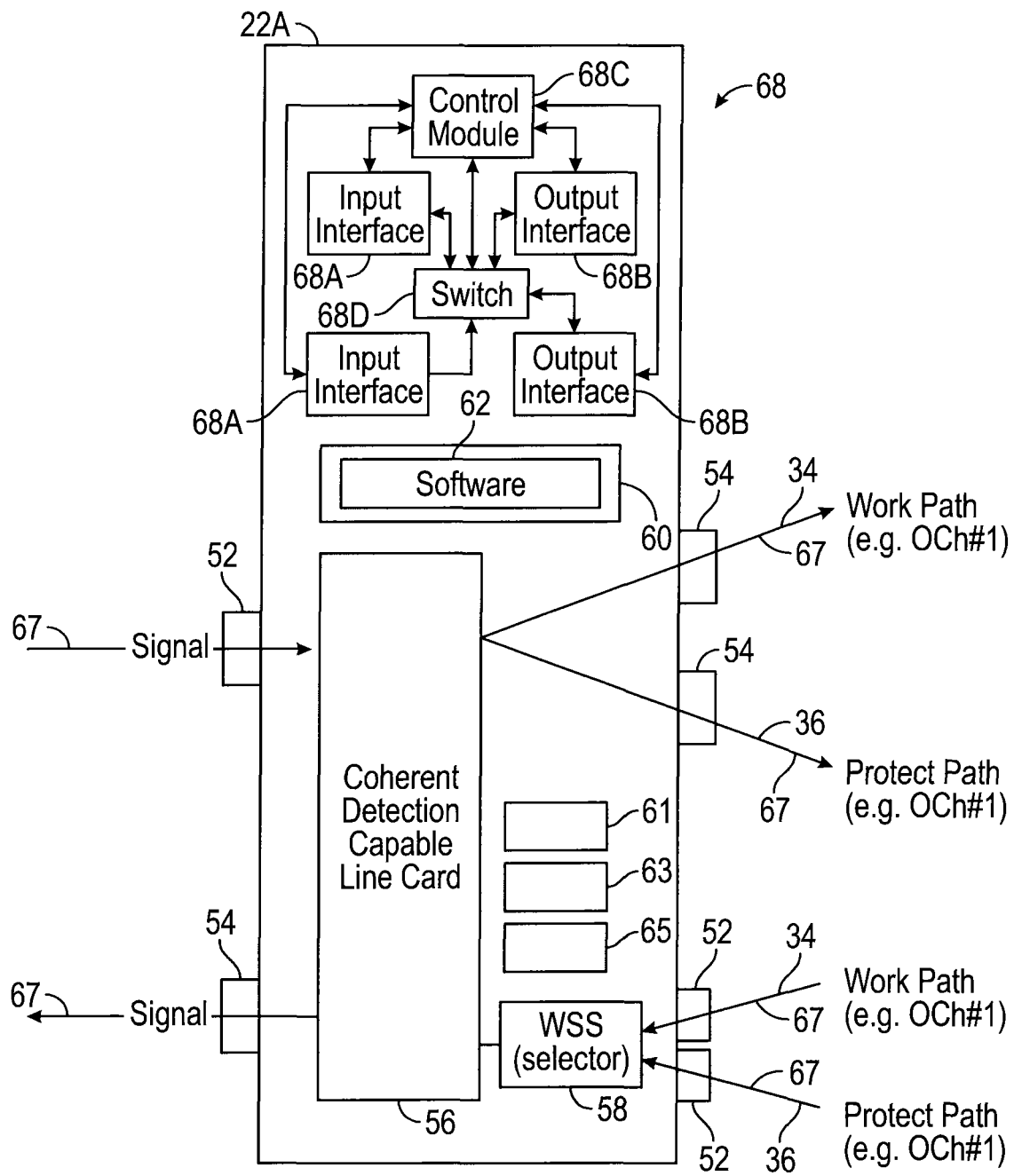
FIG. 2 is a block diagram of an aspect of an exemplary node in accordance with the present disclosure.
Figure 3:
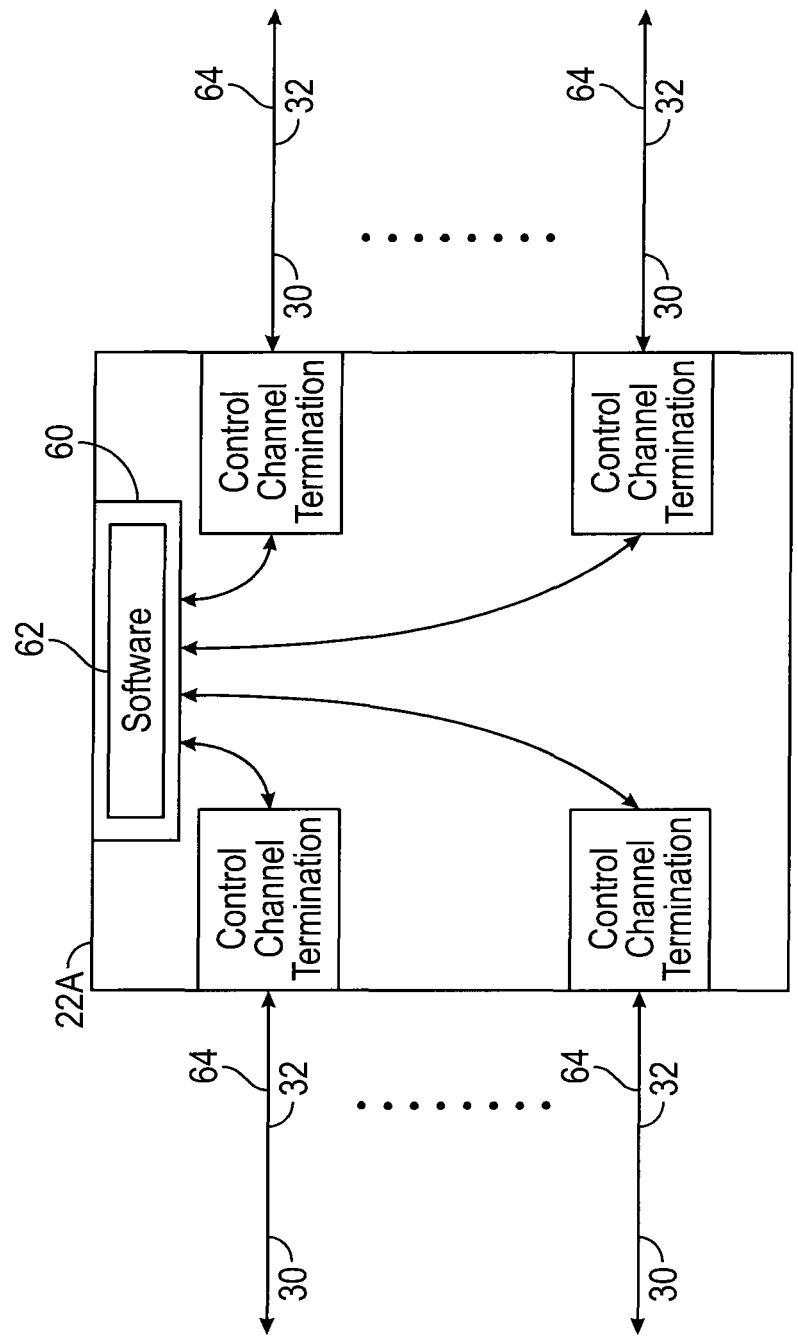
FIG. 3 is a block diagram of another aspect of the exemplary node of FIG. 2.

Referring to FIGS. 2 and 3, shown therein are block diagrams of aspects of an exemplary optical node 22a constructed in accordance with the present disclosure. In general, the optical nodes 22a-22n transmit and receive data traffic and control signals.

The optical nodes 22a-22n can be implemented in a variety of ways. Nonexclusive examples include optical line terminals (OLTs), optical crossconnects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

As shown in FIG. 2, the exemplary optical node 22a is provided with one or more input interfaces 52, one or more output interfaces 54, and circuitry such as one or more line card 56, one or more switch 58, and one or more control module 60. The optical node 22a may also include non-transitory memory (not shown), either within the control module 60 and/or the switch 58, or separate from the control module 60 and/or the switch 58. As is well known to one having skill in the art, the optical node 22a may include other components, nonexclusive examples of which include one or more multiplex card 61, one or more demultiplex card 63, and/or one or more amplifier card 65.

In general, the control module 60 serves to control the operations of the optical node 22a. The control module 60 may have software 62 installed on the control module 60. In some implementations, the control module 60 and/or software 62 controlling the operations of the optical node 22a may be located separately from the optical node 22a. In one implementation, the software 62 may be network control software and be configured within a network module. The network module may be a central entity configured to analyze and/or control operations of one or more optical nodes 22. For example, the network module may be centralized setup, SDN setup, global setup, and/or the like. Exemplary network modules are further described in U.S. Ser. No. 14/145,575, "MULTI-LAYER NETWORK RESILIENCY WITH SOFTWARE DEFINED ORCHESTRATION", which is hereby incorporated by reference in its entirety.

In general, the line card 56 receives and transmits data traffic signals 67 indicative of data traffic. The line card 56 is capable of coherent detection. The line card 56 may have firmware installed on the line card 56, as is well known to those having skill in the art. Nonexclusive examples of line card 56 include Field Programmable Gate Arrays and ASICs. The line card 56 may monitor health of the data traffic received by the optical node 22a.

The switch 58, also referred to as a selector, may be a Wavelength Selective Switch (WSS). When the optical node 22a receives data traffic, the switch 58 is used to select data traffic from either the working path 34 or the protection path 36 based on the status of the optical layer, as detected from the data path and the control path in accordance with the present disclosure, as will be further described herein. The switch 58 is in communication with the line card 56 and the control module 60.

The input interface(s) 52 and the output interface(s) 54 of the optical node 22a are adapted to communicate with corresponding input interface(s) 52, and output interface(s) 54 of one or more other optical node 22b-22n within the optical transport network 20 via communication links 30, as shown in FIG. 1. An example of an input interface 52 and/or an output interface 54 is an Ethernet card or optical port. In general, each of the input interface(s) 52 and/or the output interface(s) 54 may have a unique logical identification, such as an IP address.

The implementation of the input interface(s) 52, and the output interface(s) 54 will depend upon the particular type of communication link 30 that the particular input interface 52 and/or output interface 54 is designed to communicate with. For example, one of the input interfaces 52 can be designed to communicate wirelessly with another optical node 22 within the optical transport network 20, while one of the output interfaces 54 of the optical node 22 can be designed to communicate optically through a fiber-optic link. For a particular optical node 22, multiple input interfaces 52 can be of the same type or different types; multiple output interfaces 54 can be of the same type or different types; and the input interface(s) 52 and output interface(s) 54 can be of the same type or different types.

The input interface 52 and the output interface 54 are shown separately for purposes of clarity. However, it should be understood that one or more of the input interfaces 52 and/or the output interfaces 54 could be connected to a single communication link 30 and implemented as a single device, such as a line module.

The components of the optical node 22 may be implemented as separate devices, which may have their own power supply, local memory, and processing equipment. In another example, the optical node 22 can be implemented as a single device having a shared power supply, memory and processing equipment. Or, in another example, the optical node 22 can be implemented in a modular manner in which one or more components share a power supply and/or housing.

It should be noted that the optical nodes 22 may be integrated nodes having Layer 1, 2 or 3 resources 68 integrated therein as one skilled in the art will appreciate. The layer 1, 2, or 3 resources 68 may include one or more input interfaces 68a, one or more output interfaces 68b, a control module 68c, and a switch 68d.

In general, the input interfaces 68a are adapted to receive traffic, and the output interfaces 68b are adapted to transmit traffic. The switch 68d serves to communicate the traffic from the input interface(s) 68a, to the output interface(s) 68b. And, the control module 68c serves to control the operations of the input interfaces 68a, the output interfaces 68b, and the switch 68d.

The control module 68c preferably runs GMPLS and can be referred to herein as a control plane. The control plane preferably uses GMPLS protocols to setup one or more working connections and one or more protecting connections during a negotiation with other nodes.

The input interfaces 68a, the output interfaces 68b, the control module 68c and the switch 68d may be separate devices, which may have their own power supply, local memory and processing equipment. In another example, the input interfaces 68a, the output interfaces 68b, the control module 68c and the switch 68d can be implemented as a single device having a shared power supply, memory and processing equipment. Or, in another example input interfaces 68a, the output interfaces 68b, the control module 68c and the switch 68d can be implemented in a modular manner in which one or more of the input interfaces 68a, the output interfaces 68b, the control module 68c and the switch 68d share a power supply and/or housing.

The input interfaces 68a, and the output interfaces 68b of one node 22A are adapted to communicate with corresponding input interfaces 68a, and output interfaces 68b of another node 22. An example of an input interface 68a and/or an output interface 68b is an Ethernet card. In general, each of the input interfaces 68a and/or the output interfaces 68b may have a unique logical identification, such as an IP address. The implementation of the input interfaces 68a, and the output interfaces 68b will depend upon the particular type of communication link that the particular input interface 68a and/or output interface 68b is designed to communicate with. For example, one of the input interfaces 68a can be designed to communicate wirelessly, while one of the output interfaces 68b can be designed to communicate electrically through a cable, for example. For a particular node 22A, the input interfaces 68a can be of the same type or different types; the output interfaces 68b can be of the same type or different types; and the input and output interfaces 68a and 68b can be of the same type or different types.

As illustrated in FIG. 3, the exemplary optical node 22a, may receive one or more optical control signal 64, from one or more other optical nodes 22b-22n in the optical transport network 20, containing information regarding the Operation, Administration, and/or Maintenance (OAM) of optical layers in the optical transport network 20. The optical control signal 64 may be carried via the Optical Supervisory Channel (OSC) 32, or any suitable optical control channel. The optical layer OAM information, such as status and defect information, is mapped to specific bits in OSC 32. The OAM information communicated for a given data signal may be based at least in part on the health of the hardware in the path of the data signal and the health of the optical data path itself. Methods and systems for transmitting and receiving OAM data within the OSC 32 are more fully described in the patent application identified by U.S. Ser. No. 13/452,413, titled "OPTICAL LAYER STATUS EXCHANGE OVER OSC—OAM METHOD FOR ROADM NETWORKS" filed on Apr. 20, 2012.

In general, the optical control signal 64 is terminated at the optical node 22*a*, as illustrated in FIG. 3, where the control module 60 extracts the optical layer overhead OAM information from the optical control signal 64 in the OSC 32. The optical node 22*a* may notify software 62 in the optical node 22*a*, a network module, and/or may notify other optical nodes 22*b*-22*n* in the optical transport network 20 of the status of the optical layer, as indicated by the overhead information. In one embodiment, the optical node 22*a* inspects the optical control signal 64 for stable values before notifying the software 62 of the status of the optical layer. The filtering for stable values may be done in hardware, in which case, the association of filtering characteristics to fields may be fixed in the hardware code, for example, in a FPGA's code. Also, if granular notifications (interrupts) are provided to the software 62, the association of fields to interrupt bits may be fixed in the hardware code.

Additionally, the optical node 22*a* may write, with the software or with hardware, Operation, Administration, and/or Maintenance (OAM) information of the optical layers in the optical transport network 20 into overhead of the optical control signal 64 to be transmitted from the optical node 22*a* via the OSC 32. This information may include, for example, equipment status, incoming signal status, and/or connectivity information. Of course, the information may include any OAM information. The optical node 22*a* may then initiate, with the software, transmission of the optical control signal 64 via the Optical Supervisory Channel (OSC) 32, or any suitable optical channel.

The Optical Supervisory Channel 32 (OSC) may utilize a Synchronous Transport Signal (STS) Optical Carrier transmission rate OC-3. Alternatively, the OSC 32 may utilize a concatenated Optical Carrier transmission rate OC-3c. Alternately, the OSC 32 may utilize an Optical Carrier transmission rate OC-N, such as OC-3, OC-12, OC-48, OC-192, or OC-768, or any suitable OC-N. Optical Carrier transmission rates are a standardized set of specifications of transmission bandwidth for digital signals that can be carried on fiber optic networks. OC-3 can have an optical carrier transmission rate of up to 155.52 megabits per second. Bytes within the OC-3 can be designated to carry OAM overhead for the optical layers in the optical transport network 20. OAM information for the optical layers, OTS, OMS, and OCh/Super Channel, may be assigned to defined overhead fields with a defined number of bits. The overhead fields and bits may be assigned to defined bytes in the STS-1 frames of the OC-N. This method is further described in the patent application identified by U.S. Ser. No. 13/452,413, titled "OPTICAL LAYER STATUS EXCHANGE OVER OSC—OAM METHOD FOR ROADM NETWORKS" filed on Apr. 20, 2012.

Access to the OC-3 overhead bytes in the OSC 32 is provided for each fiber direction supported by the optical node 22*a*. As illustrated in FIG. 3, for example, in a typical optical node 22*a*, the number of fiber directions may be 1, 2, 3 4, 5, 6, 7, 8, or 9, directions. The status of individual channels transmitted on the fiber is dependent on one or more factors, nonexclusive examples of which include signal strength of the incoming signal, the health of the hardware, and connectivity information (provisional and physical). The optical node 22*a* inspects the overhead bytes in the OSC 32 and may look for stable values before notifying the software 62 of the status of the incoming data traffic.

Figure 4:
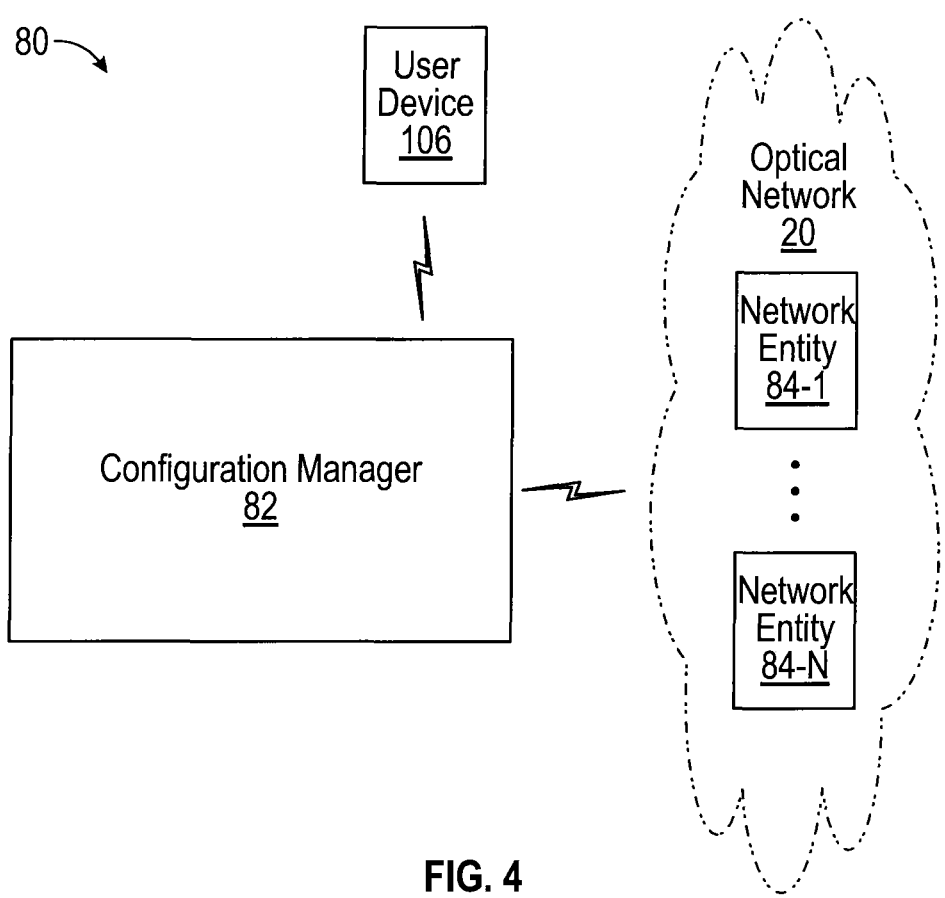
FIG. 4 is a diagram of an exemplary environment in which systems and/or methods described herein may be implemented.

FIG. 4 is a diagram of an example environment 80 in which systems and/or methods described herein may be implemented. Environment 80 may include an integrated multi-Layer, multi-vendor, Configuration Manager 82 and an optical transport network 20*a* that includes one or more network entities 84-1 through 84-N (N≥1) also referred to as network elements (hereinafter referred to individually as "NE 84" and collectively as "NEs 84"). Each of the network entities 84 can be constructed identically as the optical node 22*a*, discussed above.

The number of devices and/or networks illustrated herein is provided for explanatory purposes. In practice, there may be additional devices and/or networks, fewer devices and/or networks, different devices and/or networks, or differently arranged devices and/or networks than are shown in FIG. 4. Furthermore, two or more of the devices illustrated in FIG. 4 may be implemented within a single device, or a single device illustrated in FIG. 4 may be implemented as multiple, distributed devices. Additionally, or alternatively, one or more of the devices of environment 80 may perform one or more functions described as being performed by another one or more of the devices of environment 80. Devices of environment 80 may interconnect via wired connections, wireless connections, or a combination of wired and wireless connections.

Configuration Manager 82 may include one or more devices that gather, process, search, store, and/or provide information in a manner described herein. Configuration Manager 82 may also be referred to as an orchestration console or network controller. Configuration Manager 82 may receive and/or store network information regarding a multi-layer network, such as the optical transport network 20*a*. For example, Configuration Manager 82 may receive and/or store information regarding network configuration, which may include a quantity, location, capacity, status, and/or configuration of NEs 84; failure information, communication priority, characteristics and/or configurations (e.g., capacity) of paths and/or super-channels between NEs 84; traffic demands of NEs 84 and/or super-channels between NEs 84; and/or any other network configuration information associated with the network 20*a* (e.g., optical device configurations, digital device configurations, etc.) as described in further detail herein.

Network topology information may be determined by using standard topology discovery procedures. NEs 84 may provide network information to Configuration Manager 82, for example, through messages to Configuration Manager 82.

Configuration Manager 82 may control one or more of the NEs 84. Configuration Manager 82 may use any Application Program Interface (API) to control the NEs 84, non-exclusive examples of which include NETCONF, REST, OpenFlow, TL1, etc., to provide network management tasks such as FCAPS functionality (Fault, Configuration, Accounting, Performance, and Security functionality). For example, Configuration Manager 82 may utilize a particular API to configure/reconfigure NEs 84 and to support protection/recovery mechanisms in the optical transport network 20*a*. Configuration Manager 82 may provide information associated with network configuration changes to the optical transport network 20*a* and/or NEs 84 in order to allocate network bandwidth and/or super-channels based on the network information, such as link failures and path priorities. Configuration Manager 82 may utilize GMPLS based restoration functions and/or may utilize manually provisioned services.

Figure 5:
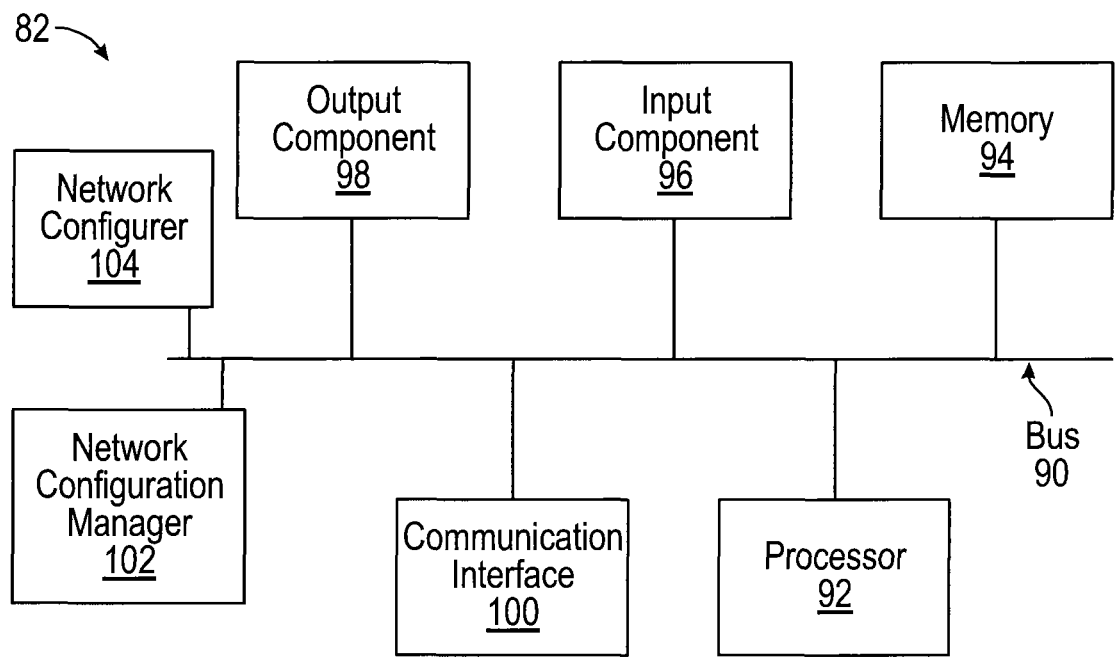
FIG. 5 is a schematic diagram of an exemplary configuration manager in accordance with the present disclosure.

FIG. 5 is a diagram of example components of the Configuration Manager 82. Of course, the Configuration Manager 82 components may be split into multiple devices, such as multiple NEs 84, or other devices in and/or outside of the optical transport network 20*a*.

Configuration Manager 82 may include a bus 90, a processor 92, a memory 94, an input component 96, an output component 98, and a communication interface 100. In some implementations, Configuration Manager 82 may include additional components, fewer components, different components, or differently arranged components than those illustrated in FIG. 5.

Bus 90 may include a path that permits communication among the components of Configuration Manager 82. Processor 92 may include one or more processor, such as one or more microprocessor, and/or any processing logic (e.g., a field-programmable gate array ("FPGA"), an application-specific integrated circuit ("ASIC"), etc.) that may interpret and execute instructions. Memory 330 may include a random access memory ("RAM"), a read only memory ("ROM"), and/or any type of dynamic or static storage device (e.g., a flash, magnetic, or optical memory) that may store information and/or instructions for use by processor 92.

Input component 96 may include any mechanism that permits a user to input information to Configuration Manager 82 (e.g., a keyboard, a keypad, a mouse, a button, a switch, etc.). Output component 98 may include any mechanism that outputs information (e.g., a display, a speaker, one or more light-emitting diodes ("LEDs"), etc.). Communication interface 100 may include any transceiver-like mechanism, such as a transceiver and/or a separate receiver and transmitter that enables device Configuration Manager 82 to communicate with other devices and/or systems, such as via a wired connection, a wireless connection, or a combination of wired and wireless connections. For example, communication interface 100 may include mechanisms for communicating with another device and/or system via a network, such as optical transport network 20*a*. Additionally, or alternatively, communication interface 100 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Configuration Manager 82 may perform various operations described herein. Configuration Manager 82 may perform these operations in response to processor 92 executing software instructions contained in a computer-readable medium, such as memory 94. A computer-readable medium may be defined as a non-transitory memory device. A memory device may include space within a single storage device or space spread across multiple storage devices.

Software instructions may be read into memory 94 from another computer-readable medium or from another device via communication interface 100. Software instructions stored in memory 94 may cause processor 92 to perform processes that are described herein. Additionally, or alternatively, hardwired circuitry may be used in place of or in combination with software instructions to implement processes described herein. Thus, implementations described herein are not limited to any specific combination of hardware circuitry and software.

Configuration Manager 82 may include a network configuration manager 102 and a network configurer 104. Each of functional components 102-104 may be implemented using one or more components of Configuration Manager 82. The functional components of Configuration Manager 82 may be distributed singularly or duplicatively in any manner between NEs and/or devices external to the optical transport network 20*a*. In some implementations, Configuration Manager 82 may include other functional components (not shown) that aid in managing network configurations and allocating network resources. Network configuration manager 102 ("NCM 102") may perform operations associated with managing a network configuration. In some implementations, NCM 102 may receive network configuration information from NEs 84.

The initial network configuration information provided to NCM 102 may be supplemented with network configuration information received from NEs 84. For example, NEs 84 may provide real-time network deployment information to update the initial network configuration information. For example, NCM 102 may receive network configuration information from NEs 84 that identifies newly-deployed NEs 84 and/or new super-channels between NEs 84. Additionally, or alternatively, NCM 102 may receive other network configuration information from NEs 84, such as super-channel allocation information that identifies super-channels that are available for optical transmission, assigned to transmit optical signals, currently being used to transmit optical signals, and/or blocked from transmitting optical signals.

Network configurer 104 may perform operations associated with configuring an optical network and/or network entities associated with an optical network. For example, network configurer 104 may aid in configuring the optical transport network 20*a* and/or NEs 84. Network configurer 104 may receive information associated with network configuration changes. Network configurer 104 may communicate the information associated with the changes to NEs 84 (and/or other devices in optical transport network 20*a*) so that NEs 84 may adjust their configuration in accordance with the network configuration changes. For example, network configurer 104 may provide instructions to NEs 84 that indicate that NEs 84 are to reserve capacity (e.g., bandwidth) over one or more super-channels connecting NEs 84. In some implementations, network configurer 104 may receive information validating a changed configuration from NEs 84, and may provide the configuration validation information to user device 106.

Returning now to FIGS. 1 and 4, NEs 84 may include one or more devices that gather, process, store, and/or provide information in a manner described herein. For example, NEs 84 may include one or more optical data processing and/or traffic transfer devices, such as optical nodes 22, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, NEs 84 may include OADMs and/or ROADMs capable of being configured to add, drop, multiplex, and demultiplex optical signals. NEs 84 may process and transmit optical signals to other NEs 84 throughout optical transport network 20a in order to deliver optical transmissions.

Optical nodes 22 and elements are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

Configuration Manager 82 may provide information associated with the network configuration changes to another device, such as user device 106, so that a user may interact with the Configuration Manager 82 and/or the optical transport network 20a. User device 106 may include one or more devices that gather, process, search, store, and/or provide information in a manner described herein. In some implementations, user device 106 may include a computer (e.g., a desktop computer, a laptop computer, a tablet computer, etc.), a radiotelephone, a personal communications system ("PCS") terminal (e.g., that may combine a cellular telephone with data processing and data communications capabilities), a personal digital assistant ("PDA") (e.g., that may include a radiotelephone, a pager, Internet/intranet access, etc.), a smart phone, and/or any other type of computation and/or communication device. User device 106 may provide information to and/or receive information from other devices, such as Configuration Manager 82. For example, user device 106 may receive network configuration information from Configuration Manager 82, and may send information associated with network configuration changes to Configuration Manager 82.

The optical transport network 20a may include any type of network that includes the use of light as a transmission medium. For example, the optical transport network 20a may include a fiber-optic based network, an optical transport network, a light-emitting diode network, a laser diode network, an infrared network, and/or a combination of these or other types of optical networks. The optical transport network 20a may include Layer 2/Layer 3 NEs, for example, routers. Optical transport network 20a may include integrated ROADM and OTN NEs 84, providing L1 and L0 functionality. The optical transport network 20a may include communication links 30 between NEs 84 and/or the Configuration Manager 82. For the sake of clarity, Layer 2/Layer 3 NEs and the communication links between the Configuration Manager 82 and NEs 84 may not be shown in all of the figures. Network Elements and network functionality are further described in the International Telecommunication Union recommendations, including ITU-T G.709, ITU-T G.872, and ITU-T G.805, which are well known in the art. Further examples of exemplary environments are described in U.S. patent application No. 20150188624, filed on Dec. 31, 2013, the entire content of which is hereby incorporated herein by reference.

Referring to FIGS. 1 and 6A-6D, multi-layer exchange between layers (e.g., Layers 0, 1, 2, or 3) of the optical transport network 20 may aid in restoration of one or more working paths 34. In particular, multi-layer digital exchange between Layer 0 and Layer 1 will be described hereafter by way of example as an aid to restoration or establishment of working paths 34. FIGS. 6A-6D are schematic diagrams of an exemplary multi-layer environment illustrating failure scenarios and associated restoration or establishment of one or more working paths 34.

Generally, one or more messages from one or more network elements 84 in the multi-layer optical transport network 20 may provide information indicative of at least one failure of at least one working path 34 in the optical transport network 20. The working path 34 may be configured in a first layer (e.g., Layer 0) of the optical transport network 20 and carry data traffic through the optical transport network 20 in the absence of a failure. An alternate path in the first layer may be determined automatically based at least in part on information indicative of a data transport path coincident with the working path 34 in a second layer (e.g., Layer 1, 2 or 3) in the optical transport network 20. At least one signal comprising configuration instructions may be transmitted (e.g., via at least one output component) to at least one line module. The configuration instructions may direct the line module to switch and transmit the data traffic using the alternate path.

Figure 6A:
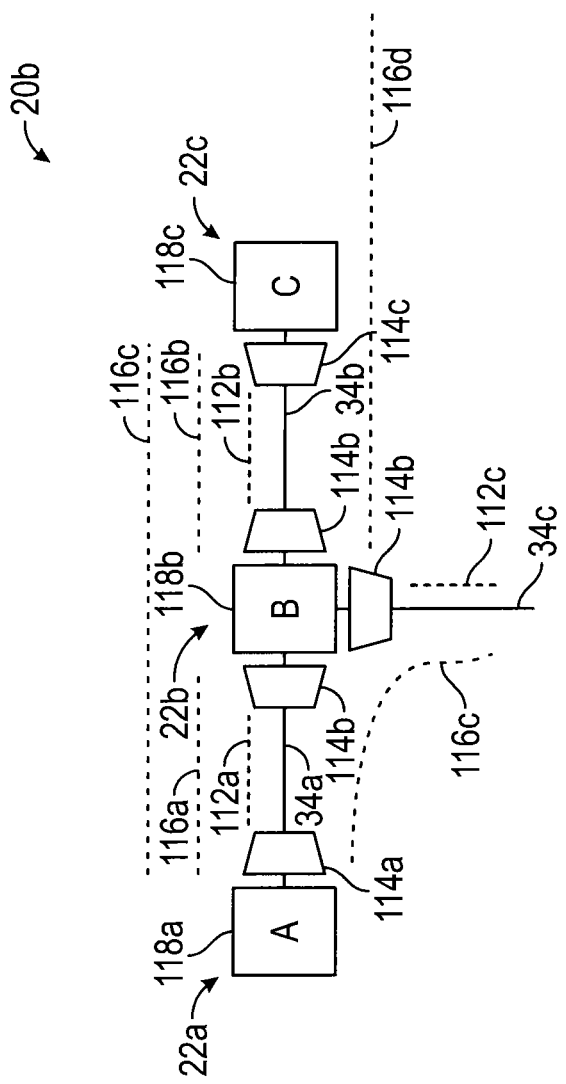
FIGS. 6A, 6B, 6C and 6D are schematic diagrams of an exemplary multi-layer environment illustrating a failure scenario.

Referring to FIG. 6A, illustrated therein is a schematic diagram of the exemplary optical transport network 20b showing Layer 0 resources of optical node 22a, optical node 22b and optical node 22c including working paths 34a and 34b. It should be noted that the optical nodes 22 may be integrated nodes having Layer 1, 2 or 3 resources integrated therein as one skilled in the art will appreciate. In this example, the working path 34a is between optical nodes 22a and 22b and the working path 34b is between optical nodes 22b and 22c. As one skilled in the art will appreciate, any number of optical nodes 22 and associated working paths 34 may be used with multiple optical nodes 22 existing between optical nodes 22a and 22c.

Optical layer links 112a, 112b and 112c may be positioned between adjacent reconfigurable optical add/drop multiplexers (ROADM) 114 of each optical node 22. For example, optical layer link 112a is between adjacent ROADM 114a and ROADM 114b. Similarly, optical layer link 112b is between adjacent ROADM 114b and ROADM 114c. Optical subnetwork configurable (SNC) links 116a, 116b, and 116c may span one or more optical layer links 112 in that optical SNC links 116a, 116b and 116c may comprise one or more optical layer links 112.

Figure 6B:
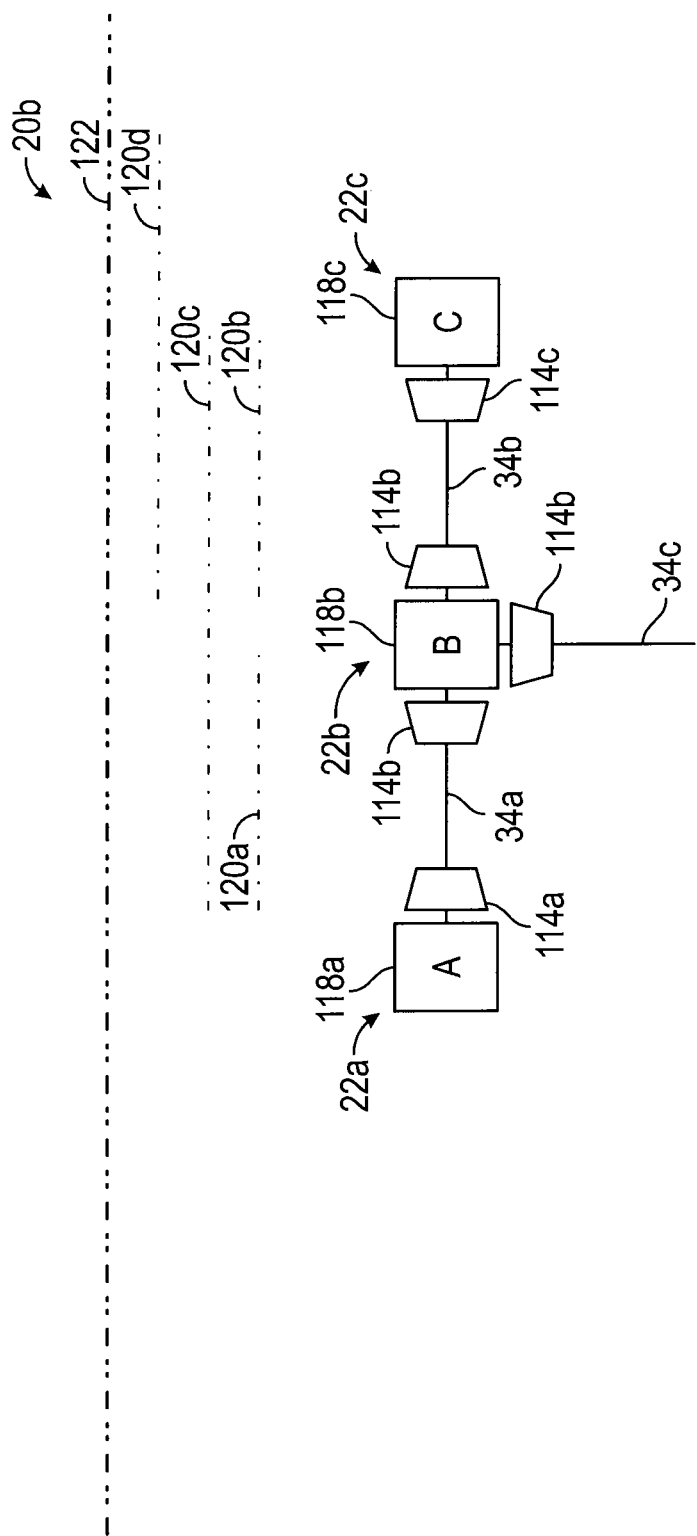

FIG. 6B illustrates Layer 1 resources associated with optical nodes 22a, 22b and 22c. In particular, digital links 120 may be configured between two or more optical nodes 22. Further, one or more subnetwork configured SNC digital links 122 may span one or more digital links 120 in that SNC digital links 122 may comprise one or more digital links 120.

Figure 6C:
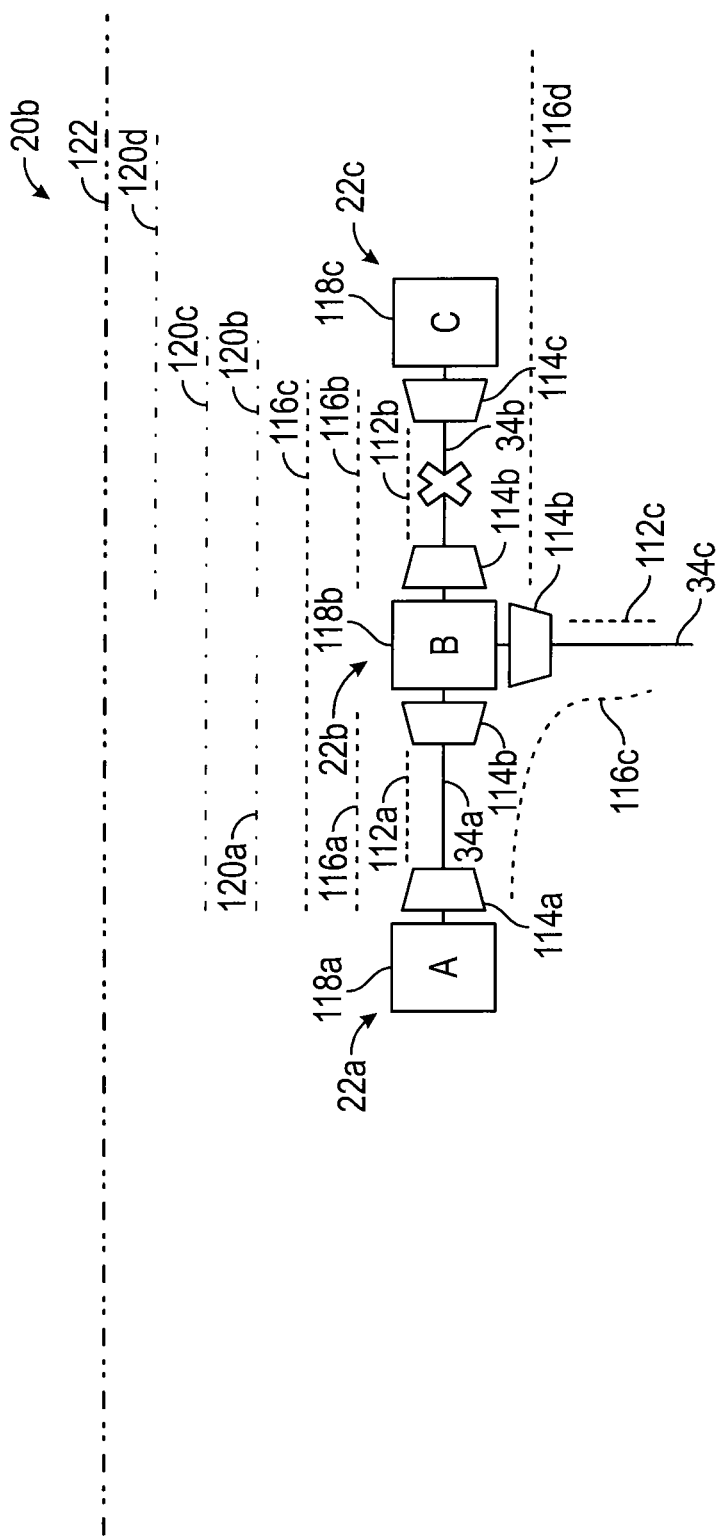

FIG. 6C illustrates Layer 0 and Layer 1 resources of optical transport network 20b having optical nodes 22a, 22b, and 22c, in which a failure, designated by "X" has occurred in the working path 34b. For example, the failure "X" may be the failure of a fiber in the communication link 30 (shown in FIG. 1) between optical node 22b and 22c. In the distributed module, each optical node 22 may be capable of detecting failures and determining order of recovery as described in further detail herein. For example, using information obtained related to one or more digital links 120, the optical node 22b may determine an order to restore the optical SNC link 116b and the optical SNC link 116e based on the failure "X". Generally, restoration and/or order of restoration may be based at least in part on information indicative of a data transport path (e.g., digital links 120) coincident with optical SNC links 116. The order of restoration may include analysis of the one or more digital links 120 (e.g., digital link 120 carrying maximum amount of traffic), number of high priority (HP) services carried on the digital link 120, number of services needing single-level failure recovery but are not protected at Layer 1 or multiple level failure recovery but only partially intended in Layer 1, and/or the like. Within a distributed module, each optical node 22 within the optical transport network 20b may determine order of restoration as described in further detail herein. Within a network module, a central entity may determine order of restoration (e.g., based on overview of the entire optical transport network 20, at each optical node 22, and/or the like) as described in further detail herein.

Figure 6D:
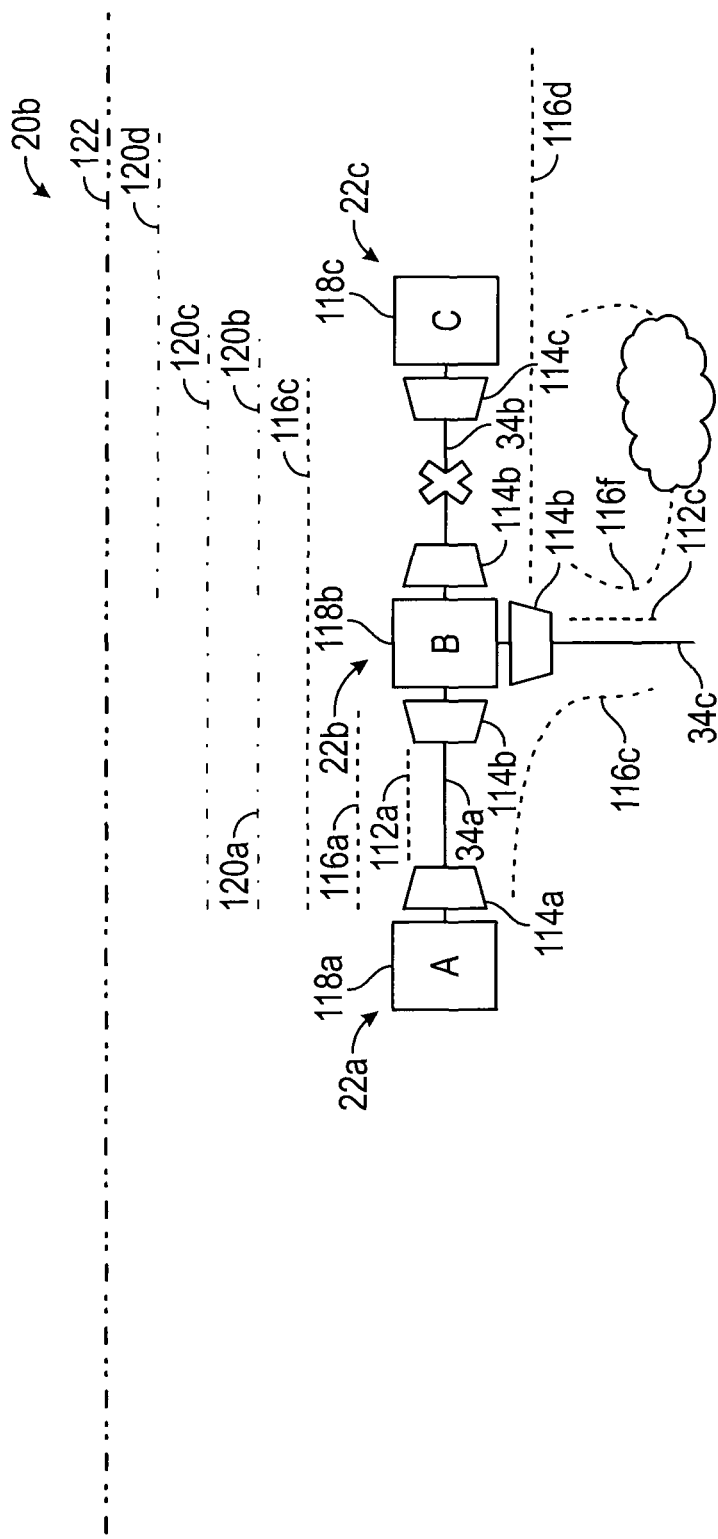

FIG. 6D illustrates a schematic diagram wherein restoration of optical SNC link 116c is restored by establishing a new optical SNC link 116f along a different path working path 34 from working path 34b. The optical SNC link 116f may be over a parallel working path 34, for example, or over a sequence of working paths 34 through ROADMs 114 in a portion of the optical transport network 20b avoiding the failed working path 34b.

Block diagrams showing exemplary embodiments in which information from Layer 1 is used to restore a failed working connection in Layer 0 are described below. It should be understood that the functionality described below, however, is equally applicable in other combinations of Layers. For example, information from Layers 2 or 3 can be used to restore a failed working connection in Layer 0, or Layer 1. Further, although the following discusses the computation of traffic at Layer 1 for assisting in restoring working connections in Layer 0, it should be understood that traffic computed at Layers 2 or 3 can also be used in restoring working connections in Layer 0, for example.

Figure 7:
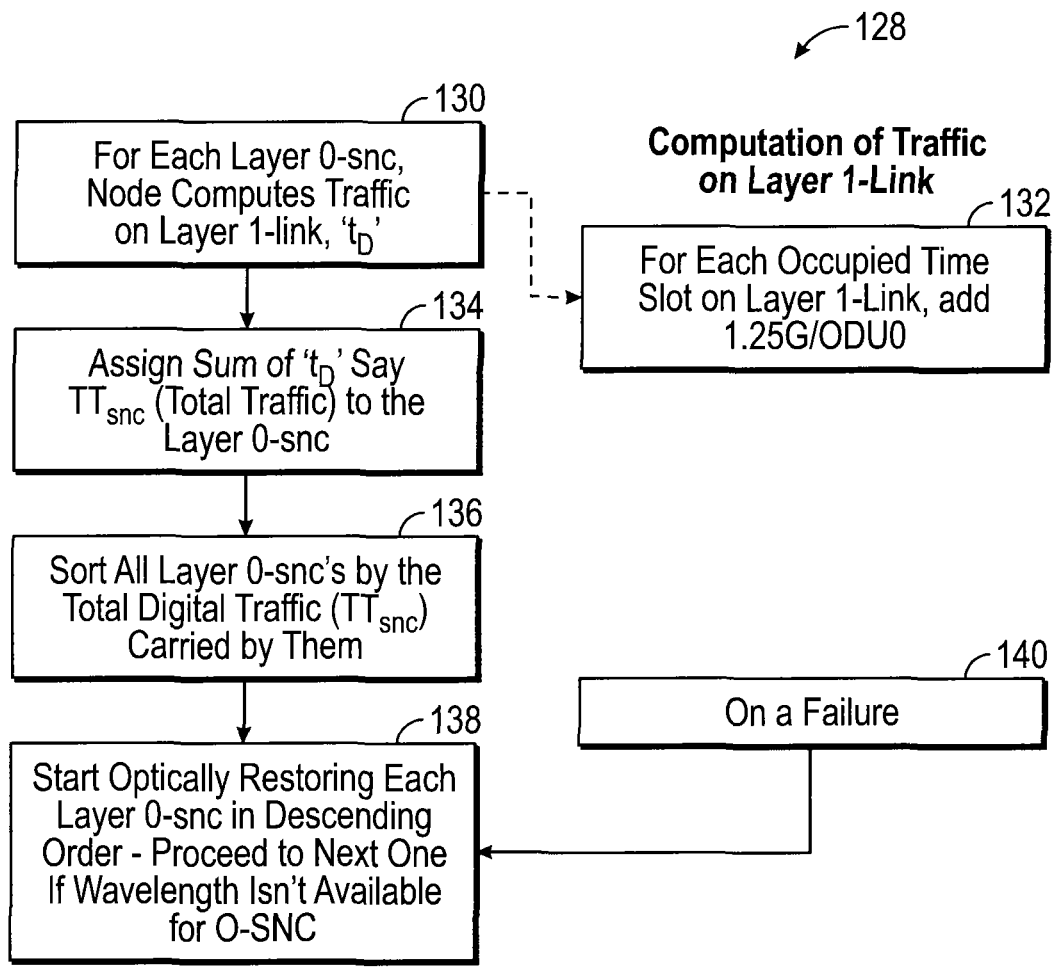
FIG. 7 is a block diagram illustrating exemplary logic for restoring a failed working connection utilizing systems and/or methods of the present disclosure.

FIG. 7 is a block diagram 128 illustrating exemplary logic for restoring a failed working connection in a distributed module with an agnostic service type utilizing systems and/or methods of the present disclosure. With the agnostic service type, services using the Layer 0 and Layer 1 are not inspected to make protection and/or restoration decisions. In the distributed module, generally the optical SNC links 116 terminate at the optical node 22. The logic generally decides restoration order and may be pre-computed either in a periodic manner (i.e., pre-determined regular intervals), intermittently (i.e., irregular intervals) or upon addition and/or removal of traffic (i.e., threshold basis with the threshold being addition and/or removal of traffic and/or at a pre-determined amount of traffic). Using such logic, restoration time after a failure may be reduced as compared to other methods within the prior art.

Referring to FIG. 7, generally, traffic (t) on one or more digital links 120 may be analyzed to determine restoration order. For example, volume of traffic (t) may be determined and analyzed to determine restoration order of the optical SNC links 116. In a step 130, for each optical SNC link 116, traffic $t_D$ on one or more corresponding digital links 120 may be determined. In determining traffic $t_D$ on each digital link 120, for each occupied time slot on the digital link 120, 1.25G/ODU0 may be added to the traffic $t_D$ as shown in step 132. In a step 134, a total digital traffic sum $TT_{SNC}$ may be assigned to each optical SNC link 116 based on the traffic $t_D$ determined for each corresponding digital link 120. In a step 136, optical SNC links 116 may be organized and/or sorted (i.e., largest to smallest) by the total digital traffic sum $TT_{SNC}$ carried. Sorting of the optical SNC links 116 by the total digital traffic sum $TT_{SNC}$ provides an order for restoration of each optical SNC link 116. The total digital traffic sum $TT_{SNC}$ may be determined periodically or on a threshold basis while working path 34 is in non-failure mode. In a step 138, upon failure 140, each optical SNC link 116 may be optically restored in descending order. If one or more wavelengths is not available for determination of traffic $t_D$ or $TT_{SNC}$, restoration may proceed to subsequent optical SNC links 116.

Figure 8:
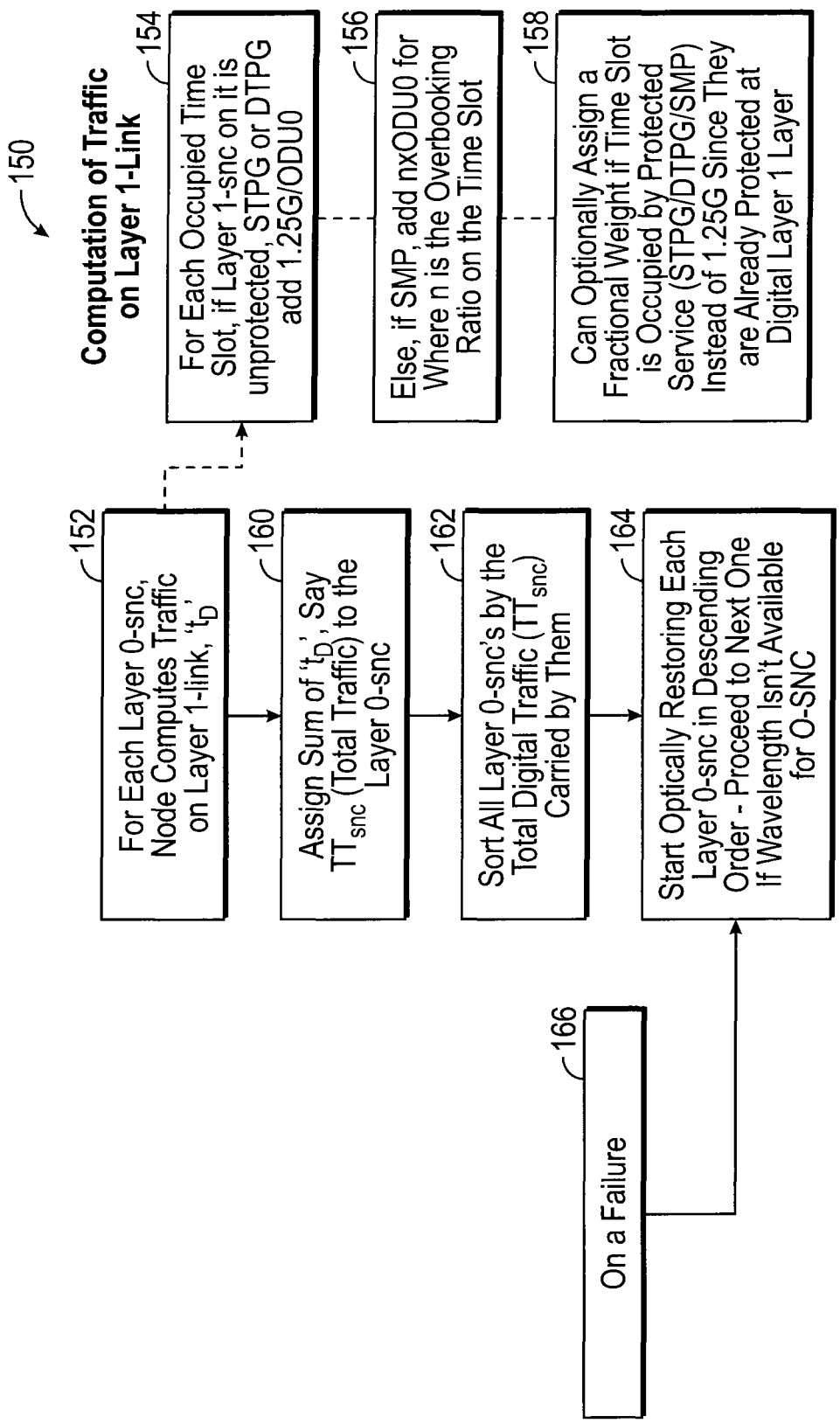
FIG. 8 is a block diagram illustrating exemplary logic for restoring a failed working connection utilizing systems and/or methods of the present disclosure.

FIG. 8 is a block diagram 150 illustrating exemplary logic for restoring a failed working connection in a distributed module with aware service type utilizing systems and/or methods of the present disclosure. With aware service type, the module may be aware of the details of the Layer 1 resources and these details may be used in determining restoration and/or protection decisions.

Generally, traffic (t) on one or more digital links 120 may be analyzed to determine restoration order by the optical node 22. For example, volume of traffic (t) may be determined and analyzed to determine restoration order of the optical SNC links 116. In a step 152, for each optical SNC link 116, traffic $t_D$ on one or more corresponding digital links 120 may be determined.

Steps 154-158 illustrate exemplary logic for determining traffic $t_D$. In a step 154, for each occupied time slot on the digital link 120, if the associated SNC digital link 122 is unprotected, Single Tributary Adaptation Module (TAM) Protection Group (STPG) or Dual TAM Protection Group (DTPG) then add 1.25G/ODU0. In a step 156, if the SNC digital link 122 is shared mesh protection (SMP), add nxODU0 for each occupied time slot, where n is an overbooking ratio on the time slot. Optionally, a fractional weight may be assigned if the timeslot is occupied by protected service (STPG/DTPG/SMP) instead of 1.25G as protection is already at Layer 1 as shown in step 158.

In a step 160, a total digital traffic sum $TT_{SNC}$ may be assigned to each optical SNC link 116 based on the traffic $t_D$ determined for each digital link 120. In a step 162, optical SNC links 116 may be organized and/or sorted (i.e., largest to smallest) by the total digital traffic sum $TT_{SNC}$ carried. Sorting of the optical SNC links 116 by the total digital traffic sum $TT_{SNC}$ provides an order for restoration of each optical SNC link 116. The total digital traffic sum $TT_{SNC}$ may be determined periodically or on a threshold basis while working path 34 is in non-failure mode. In a step 164, upon failure 166, each optical SNC link 116 may be optically restored in descending order. If one or more wavelengths is not available for determination of traffic $t_D$ or $TT_{SNC}$, restoration may proceed to subsequent optical SNC links 116.

Figure 9:
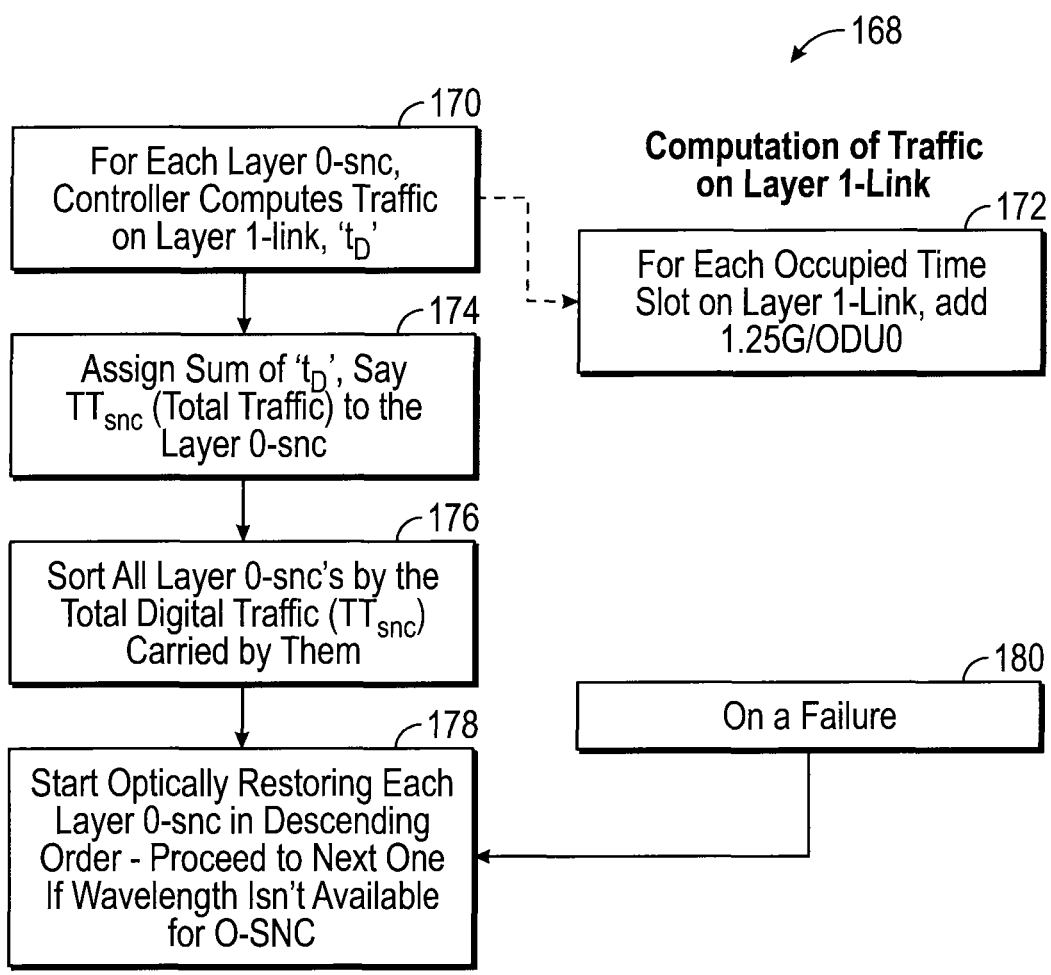
FIG. 9 is a block diagram illustrating exemplary logic for restoring a failed working connection utilizing systems and/or methods of the present disclosure.

FIG. 9 is a block diagram 168 illustrating exemplary logic for restoring a failed working connection in a network module with an agnostic service type utilizing systems and/or methods of the present disclosure. In the network module, generally, a controller, orchestrator or server may examine and analyze multiple optical SNC links 116 affected by failure of the working path 34 and determine a restoration order. Using the network module, visibility over an extensive portion of the optical transport network 20 or the entire optical transport network 20 may reduce restoration time after a failure as compared to other methods within the prior art. The logic generally decides restoration order and may be pre-computed either in a periodic manner or upon addition and/or removal of traffic (i.e., threshold basis).

Referring to FIG. 9, generally, traffic (t) on one or more digital links 120 may be analyzed by a controller, orchestrator or server to determine restoration order. For example, in step 170, volume of traffic (t) may be determined and analyzed to determine restoration order of the optical SNC links 116. Similar to the distributed module, in determining traffic $t_D$ on each digital link 120, for each occupied time slot on the digital link 120, 1.25G/ODU0 may be added to the traffic $t_D$ as shown in step 172. In a step 174, a total digital traffic sum $TT_{SNC}$ may be assigned to each optical SNC link 116 based on the traffic $t_D$ determined for each digital link 120. In a step 176, optical SNC links 116 may be organized and/or sorted (i.e., largest to smallest) by the total digital traffic sum $TT_{SNC}$ carried. Sorting of the optical SNC links 116 by the total digital traffic sum $TT_{SNC}$ provides an order for restoration of each optical SNC link 116. The total digital traffic sum $TT_{SNC}$ may be determined periodically or on a threshold basis while working path 34 is in non-failure mode. In a step 178, upon failure 180, each optical SNC link 116 may be optically restored in descending order. If one or more wavelengths is not available for determination of traffic $t_D$ or $TT_{SNC}$, restoration may proceed to subsequent optical SNC links 116.

Figure 10:
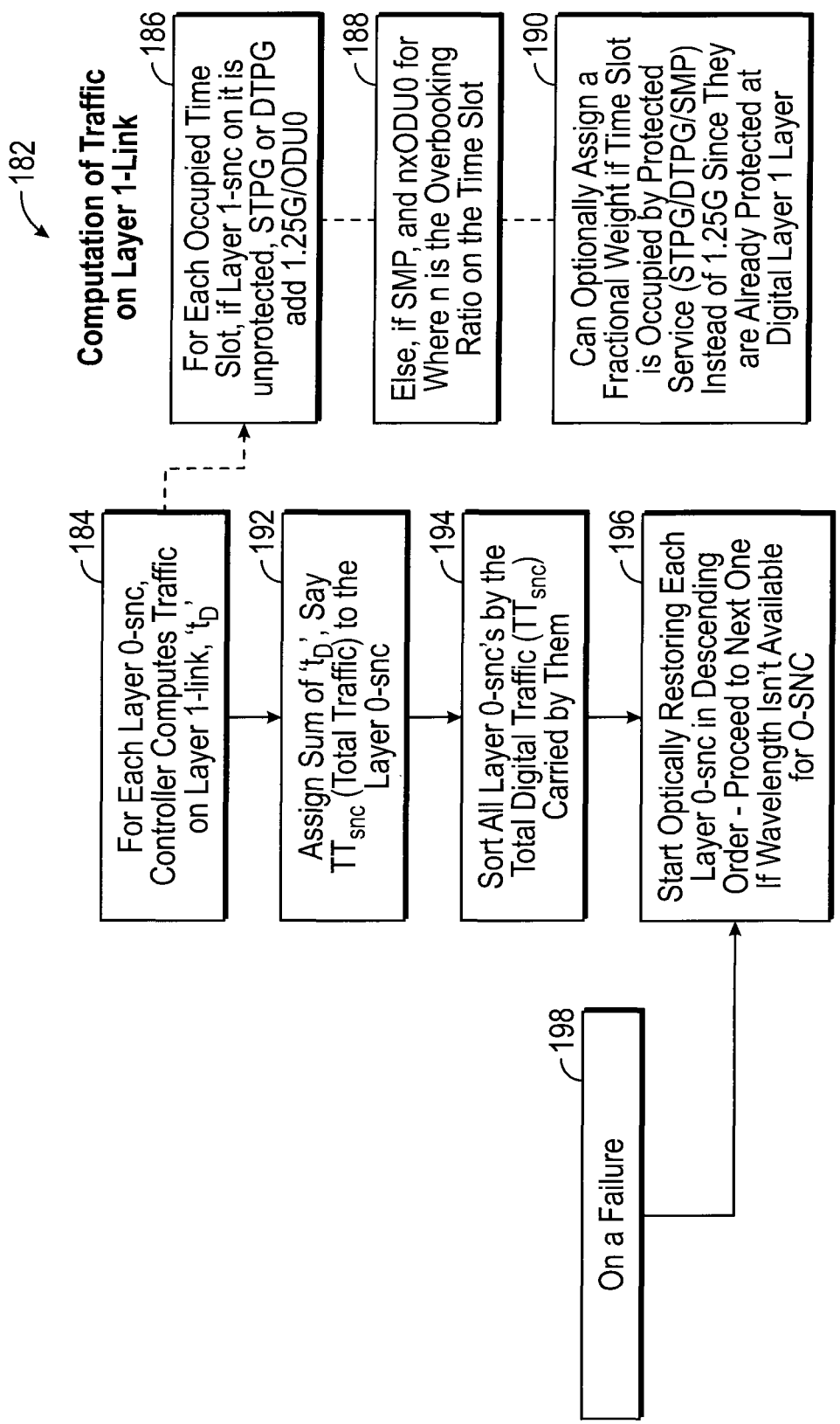
FIG. 10 is a block diagram illustrating exemplary logic for restoring a failed working connection utilizing systems and/or methods of the present disclosure.

FIG. 10 is a block diagram 182 illustrating exemplary logic for restoring a failed working connection in a network module with an aware service type utilizing systems and/or methods of the present disclosure.

Traffic (t) on one or more digital links 120 may be analyzed by a controller to determine restoration order. For example, volume of traffic (t) may be determined and analyzed to determine restoration order of the optical SNC links 116. In a step 184, for each optical SNC link 116, traffic $t_D$ on one or more corresponding digital links 120 may be determined.

Steps 186-190 illustrate exemplary logic for determining traffic $t_D$. Similar to the distributed module shown in FIG. 8, in a step 186, for each occupied time slot on the digital link 120, if the associated SNC digital link 122 is unprotected, STPG or DTPG then add 1.25G/ODU0. In a step 188, if the SNC digital link 122 is SMP, add nxODU0 for each occupied time slot, where n is the overbooking ratio on the time slot. Optionally, a fractional weight may be assigned if the timeslot is occupied by protected service (STPG/DTPG/SMP) instead of 1.25G as protection is already at Layer 1 as shown in step 190.

In a step 192, a total digital traffic sum $TT_{SNC}$ may be assigned to each optical SNC link 116 based on the traffic $t_D$ determined for each digital link 120. In a step 194, optical SNC links 116 may be organized and/or sorted (i.e., largest to smallest) by the total digital traffic sum $TT_{SNC}$ carried. Sorting of the optical SNC links 116 by the total digital traffic sum $TT_{SNC}$ provides an order for restoration of each optical SNC link 116. The total digital traffic sum $TT_{SNC}$ may be determined periodically or on a threshold basis while working path 34 is in non-failure mode. In a step 196, upon failure 198, each optical SNC link 116 may be optically restored in descending order. If one or more wavelengths is not available for determination of traffic $t_D$ or $TT_{SNC}$, restoration may proceed to subsequent optical SNC links 116.

Figure 11:
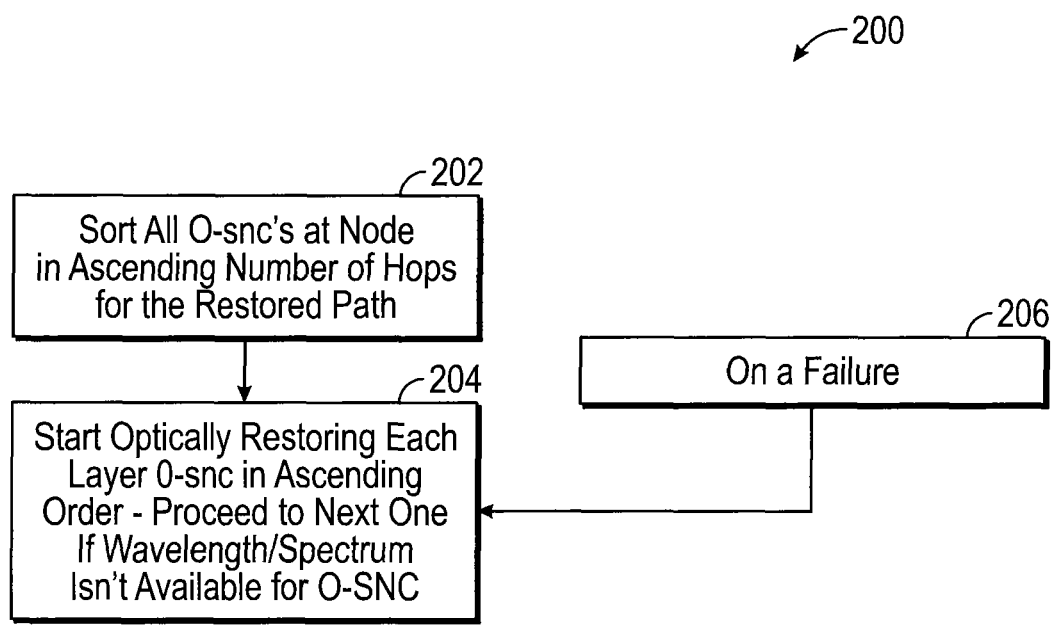
FIG. 11 is a block diagram illustrating exemplary logic for restoring a failed working connection utilizing systems and/or methods of the present disclosure.
Figure 12:
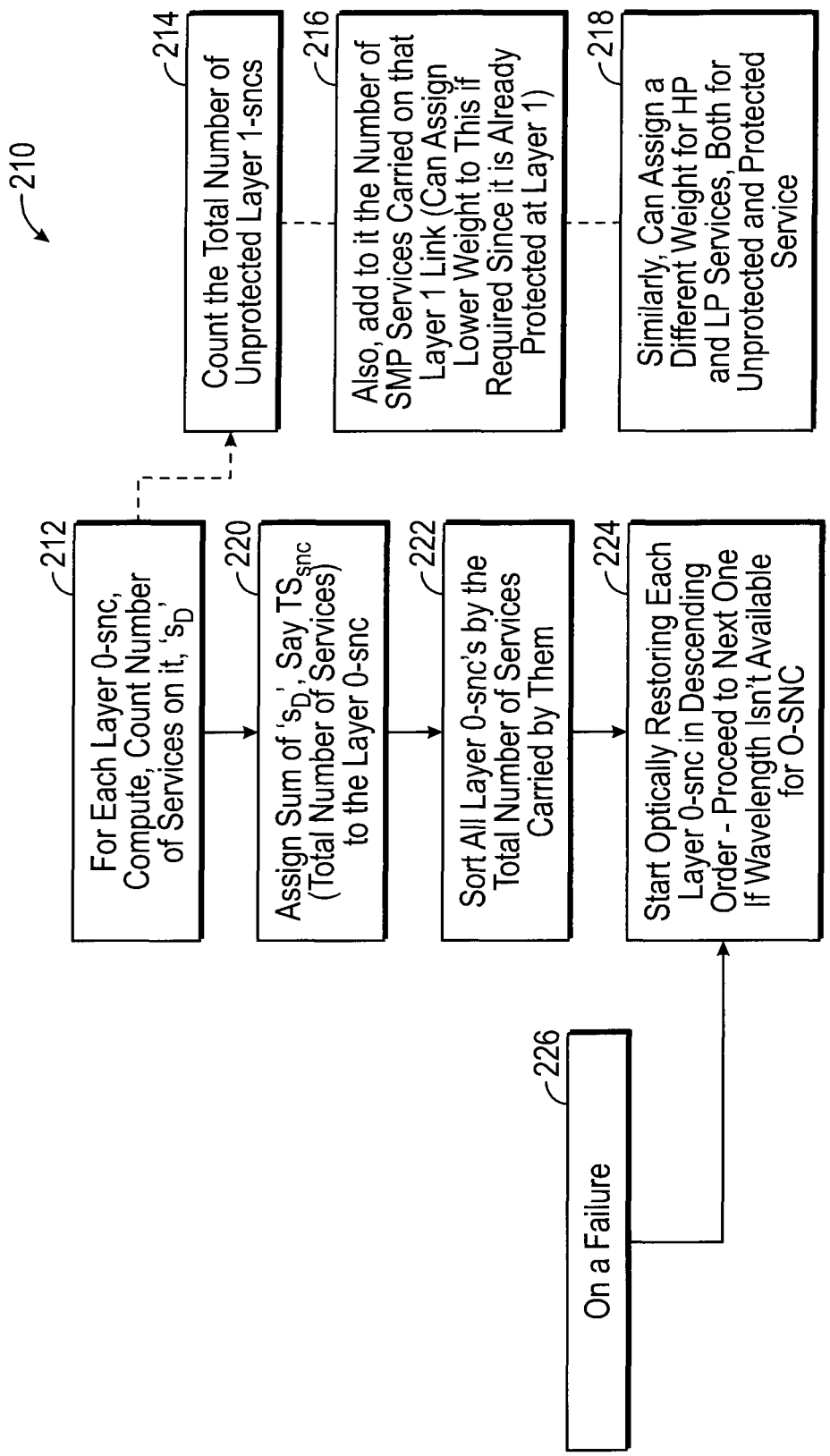
FIG. 12 is a block diagram illustrating exemplary logic for restoring a failed working connection utilizing systems and/or methods of the present disclosure.
Figure 13:
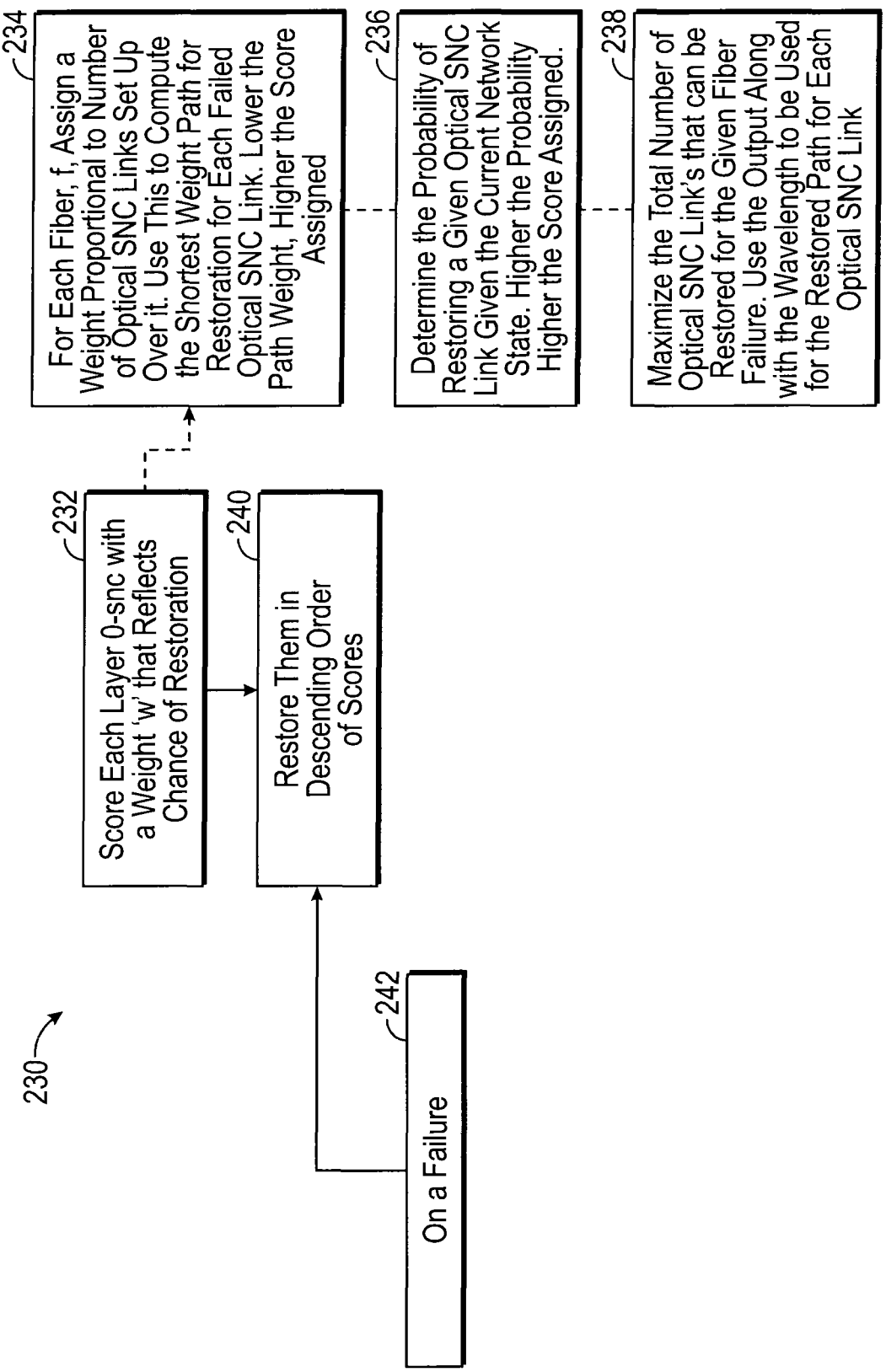
FIG. 13 is a block diagram illustrating exemplary logic for restoring a failed working connection utilizing systems and/or methods of the present disclosure.

FIGS. 11-13 are block diagram illustrating exemplary logic for restoring a failed working connection in a network module with an aware service type utilizing systems and/or methods of the present disclosure. For simplicity, in the following logic within the block diagrams only one variant is provided; however, for each block diagram, each type of module may be used including, distributed module (service type agnostic and aware), network module (service type agnostic and aware), and service type priority aware (i.e., higher weight for high priority (HP) services and lower for low priority (LP) services) for both distributed module and network module. Further, the logic provided generally decides restoration order and may be pre-computed either in a periodic manner or upon addition and/or removal of traffic (i.e., threshold basis). In some embodiments, information analyzed and determined for restoration may be used to provision one or more new optical SNC links 116 in failure free scenarios (i.e., non-failure mode) and/or to reduce contention. The logic within the following block diagrams may be applicable to both tunable restoration and non-tunable restoration (i.e., wherein wavelength used pre and post failure is the same). Additionally, the logic within the following block diagrams may be combined with logic provided in FIGS. 7-10 (e.g., determination of data traffic) to determine order of restoration within the optical transport network 20.

FIG. 11 is a block diagram 200 illustrating exemplary logic for restoring a failed working connection utilizing systems and/or methods of the present disclosure. Generally, the optical SNC link(s) 116 may reach aware restoration (i.e., distance optical signal travels prior to reaching OEO switch for regeneration) by determining and sorting hops. Hops are the number of optical layer links 112 needing to be traversed to set up the optical SNC link 116 upon failure. The number of hops provides probability of success for restoration as new optical SNC links 116 need to find a similar part of the spectrum on all of the traversed hops. In a step 202, prior to failure, each optical SNC link 116 at the optical node 22 may be sorted in ascending order based on number of hops for each determined restoration path. In a step 204, upon failure 206, each optical SNC link 116 may be restored based on the ascending order of the number of hops for each determined restoration path. If a wavelength/spectrum is unavailable for one or more optical SNC links 116, the optical SNC link 116 may be bypassed.

FIG. 12 is a block diagram 210 illustrating exemplary logic for restoring a failed working connection utilizing systems and/or methods of the present disclosure. Generally, restoration order may be determined based on sorting of the optical SNC links 116 having maximum number of services $S_D$. In a step 212, prior to failure, for each optical SNC link 116 the number of services $S_D$ may be determined. Steps 214-218 illustrate exemplary logic for determining the number of service $S_D$. In a step 214, the total number of unprotected Layer 1 SNC digital links 122 may be determined. An unprotected Layer 1 SNC digital link 122 is one wherein no protection paths may be established in Layer-1. As such, if a failure occurs that affects the working path of the service, it may not be protected in Layer 1. In a step 216, the number of SMP services carried on the unprotected Layer 1 SNC digital links 122 may be added to the number of services $S_D$. It should be noted that a lower weight may be assigned to the number of SMP services as protection is already provided at Layer 1. In a step 218, the number of HP and LP services may be added to the number of services $S_D$. A different weight may be assigned for HP and LP services both for unprotected and protected services.

In a step 220, total number of services $TT_{SNC}$ may be assigned to each optical SNC link 116 based on the number of service $S_D$. In a step 222, the optical SNC links 116 may be sorted, prior to failure, based on the total number of service $TT_{SNC}$. In a step 224, upon failure 226, each optical SNC link 116 may be restored based on descending order of the sorted optical SNC links 116. If wavelength isn't available for one or more optical SNC links 116, the optical SNC link 116 may be bypassed.

FIG. 13 is a block diagram 230 illustrating exemplary logic for restoring a failed working connection utilizing systems and/or methods of the present disclosure. Generally, restoration order may be determined based on analysis of contention in that optical SNC links 116 most likely to find spectrum may be restored in descending order. Additionally, in some embodiments, the maximum number of optical SNC links 116 able to be restored may be determined and then restored based on an order capable of achieving restoration of all optical SNC links 116.

In a step 232, each optical SNC link 116 may be scored with a weight w. The weight w is configured to reflect probability of restoration. Steps 234-238 illustrate exemplary logic for determining weight w. In a step 234, for each fiber prior to failure, assign a weight w proportional to the number of optical SNC links 116 within the fiber. Adjust the weight w by determining the shortest weight path for restoration for each failed optical SNC link 116 wherein the lower the weight path, the higher score assigned to the weigh w. In a step 236, determine probability of restoring a given optical SNC link 116 with the current state of the optical transport network 20 wherein the higher the probability the higher the score assigned to the weight w. In a step 238, maximize the total number of optical SNC links 116 that may be restored for a given failure. Use output of the total number of optical SNC links 116 in addition to the wavelength to be used for the restored path for each optical SNC link 116. In a step 240, upon failure 242, restore each optical SNC link 116 in descending order of weight w.

Additionally, unidirectional and bidirectional protection are further described in RFC 4872, "RSVP-TE Extensions for E2E GMPLS Recovery" (May 2007). Further, logical tables in one or more databases (not shown) may be used to support protection path activation logic.

CONCLUSION

Conventionally, protection and recovery mechanisms in transport networks focus on determining and utilizing alternative digital components in the network. In accordance with the present disclosure, methods and systems are described in which orchestration of multi-layer protection and/or restoration utilizing optical components is implemented.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A computer-readable medium, comprising:
    a non-transitory memory device storing one or more instructions that, when executed by a processor, cause the processor to:
    receive, via at least one input component, at least one message from a network element in a multi-layer network comprising information indicative of at least one failure of at least one working path in the multi-layer network, wherein the working path is configured in a first layer of an Open Systems Interconnection (OSI) Model of the network and carries data through the network when there is no failure;
    determine based at least in part on information indicative of a data transport path coincident with the working path, the information being in a second layer of the OSI Model in the network different from the first layer, an alternate path in the first layer of the OSI Model for transmission of the data through the multi-layer network; and
    transmit, via at least one output component, at least one signal comprising configuration instructions to at least one line module, the configuration instructions directing the line module to switch and transmit the data using the alternate path.

2. The computer-readable medium of claim 1, wherein the first layer is Layer 0, and wherein the second layer is selected from a group consisting of Layer 1, Layer 2 and Layer 3 of the OSI Model.

3. The computer-readable medium of claim 1, wherein the processor is within a network module such that the processor is located within a controller external to an optical node, the optical node connected to the at least one working path within the multi-layer network.

4. The computer-readable medium of claim 1, wherein the information indicative of a data transport path includes data traffic.

5. The computer-readable medium of claim 1, wherein the information indicative of a data transport path coincident with the working path in the second layer of the OSI Model in the network includes a determination of high priority services carried on the second layer in the multi-layer network.

6. The computer-readable medium of claim 1, wherein the information indicative of a data transport path coincident with the working path in the second layer of the OSI Model in the multi-layer network includes a determination of services needing single-level failure recovery at the second layer in the network.

7. The computer-readable medium of claim 1, wherein the information indicative of a data transport path coincident with the working path in the second layer of the OSI Model in the multi-layer network includes a determination of services needing multiple level failure recovery in the second layer in the network.

8. The computer-readable medium of claim 1, wherein the at least one message from a network element in the multi-layer network comprising information indicative of at least one failure of at least one working path in the multi-layer network is received in pre-determined periodic intervals prior to failure of the working path.

9. The computer-readable medium of claim 1, wherein the at least one message from a network element in the multi-layer network comprising information indicative of at least one failure of at least one working path in the multi-layer network is received on a threshold basis upon addition of data traffic prior to failure of the working path.

10. The computer-readable medium of claim 1, wherein the at least one message from a network element in the multi-layer network comprising information indicative of at least one failure of at least one working path in the multi-layer network is received on a threshold basis upon removal of data traffic prior to failure of the working path.

11. A method, comprising:
    receiving, via at least one input component, at least one message from a network element in a multi-layer network comprising information indicative of at least one failure of at least one working path in the multi-layer network, wherein the working path is configured in a first layer of an Open Systems Interconnection (OSI) Model of the network and carries data through the network when there is no failure;

determining based at least in part on information indicative of a data transport path coincident with the working path, the information being in a second layer of the OSI Model in the network different from the first layer, an alternate path in the first layer of the OSI Model for transmission of the data through the multi-layer network; and transmitting, via at least one output component, at least one signal comprising configuration instructions to at least one line module, the configuration instructions directing the line module to switch and transmit the data using the alternate path.

12. The method of claim 11, wherein a first alternate path has a first number of hops lower than a second number of hops of a second alternate path, and the configuration instructions direct the line module to switch and transmit data to the first alternate path prior to the second alternate path.

13. The method of claim 11, wherein determination of the alternate path further includes information indicative of a data transport path coincident with the working path in the second layer of the OSI Model in the multi-layer network.

14. The method of claim 13, wherein the information indicative of the data transport path coincident with the working path in the second layer of the OSI Model includes data traffic.

15. The method of claim 13, wherein the information indicative of the data transport path includes a determination of high priority services carried on the second layer of the OSI Model in the multi-layer network.

16. The method of claim 13, wherein the information indicative of the data transport path includes a determination of services needing single-level failure recovery at the second layer of the OSI Model in the multi-layer network.

17. The method of claim 13, wherein the information indicative of the data transport path includes a determination of services needing multiple level failure recovery at the second layer of the OSI Model in the multi-layer network.

18. A node in a multi-layer network, comprising:
at least one input component for receiving information from a first communication link;
at least one output component for transmitting information to a second communication link;
a processor; and
a non-transitory memory device storing one or more instructions that, when executed by the processor, cause the processor to:
receive, via the at least one input component, at least one message from a network element in the multi-layer network comprising information indicative of at least one failure of at least one working path in the multi-layer network, wherein the working path is configured in a first layer of an Open Systems Interconnection (OSI) Model of the network and carries data through the network when there is no failure;
determine based at least in part on information indicative of a data transport path coincident with the working path, the information being in a second layer of the OSI Model in the network different from the first layer, an alternate path in the first layer of the OSI Model for transmission of the data through the multi-layer network; and
transmit, via the at least one output component, at least one signal comprising configuration instructions to at least one line module in the multi-layer network, the configuration instructions directing the line module to switch and transmit the data using the alternate path.

19. The node of claim 18, wherein a first alternate path has a first weight lower than a second weight of a second alternate path, and the configuration instructions direct the line module to switch and transmit data to the second alternate path prior to the first alternate path.

20. The node of claim 18, wherein determination of the weight path further includes information indicative of a data transport path coincident with the working path in the second layer of the OSI Model in the multi-layer network.

* * * * *